United States Patent [19]
Harada et al.

[11] Patent Number: 5,115,362
[45] Date of Patent: May 19, 1992

[54] CASSETTE CHANGER FOR TAPE PLAYER

[75] Inventors: Tamotsu Harada, Shizuoka; Gen Kumagai, Saitama; Kiyoshi Yanagida, Saitama; Katsuhiko Yaguchi, Saitama; Nagaki Fujioka, Saitama; Akiharu Yagi, Saitama; Koji Yanoguchi, Saitama; Satoru Kodaira, Saitama, all of Japan

[73] Assignee: Pioneer Electronic Corporation, Tokyo, Japan

[21] Appl. No.: 474,569

[22] Filed: Feb. 2, 1990

[30] Foreign Application Priority Data

Feb. 16, 1989 [JP] Japan ................................ 1-35087
Feb. 16, 1989 [JP] Japan ................................ 1-35088
Feb. 16, 1989 [JP] Japan ................................ 1-35089
Feb. 16, 1989 [JP] Japan ................................ 1-35090
Feb. 16, 1989 [JP] Japan ................................ 1-35091
Feb. 16, 1989 [JP] Japan ................................ 1-35092
Feb. 16, 1989 [JP] Japan ................................ 1-35093
Feb. 16, 1989 [JP] Japan ................................ 1-35094
Feb. 16, 1989 [JP] Japan ................................ 1-35095
Dec. 1, 1989 [JP] Japan ................................ 1-313030

[51] Int. Cl.⁵ .................................... G11B 15/68
[52] U.S. Cl. ..................................... 360/92
[58] Field of Search ......................... 360/92

[56] References Cited
U.S. PATENT DOCUMENTS 4,910,619 3/1990 Suzuki ............................ 360/92
4,974,102 11/1990 Hamachi ........................ 360/92

FOREIGN PATENT DOCUMENTS 2562305 3/1985 France .
1991223 12/1967 Netherlands .

OTHER PUBLICATIONS

Japanese Patent Publication No. 58-208961.
European Patent Search Report.

Primary Examiner—A. J. Heinz
Attorney, Agent, or Firm—Sughrue, Mion, Zinn, Macpeak & Seas

[57] ABSTRACT

A novel cassette changer for a tape player wherein a tape cassette accommodating member and a tape driving mechanism are fixed relative to each other during selection of a tape cassette and which has a comparatively small overall size and requires a comparatively low power for moving a tape cassette between the tape cassette accommodating member and tape driving mechanism. The cassette changer comprises a plurality of cassette receiving members each for removably receiving a tape cassette thereon, an accommodating member for receiving the cassette receiving members in a row thereon, an actuating means for selectively moving a cassette receiving members from a home position to a transfer position, a tape driving mechanism mounted in a fixed relationship with respect to the accommodating member for receiving a tape cassette thereon and driving a tape of the tape cassette, and a carrier for receiving a tape cassette from the selected cassette receiving member moved to the transfer position and setting the tape cassette in position onto the tape driving mechanism.

26 Claims, 28 Drawing Sheets

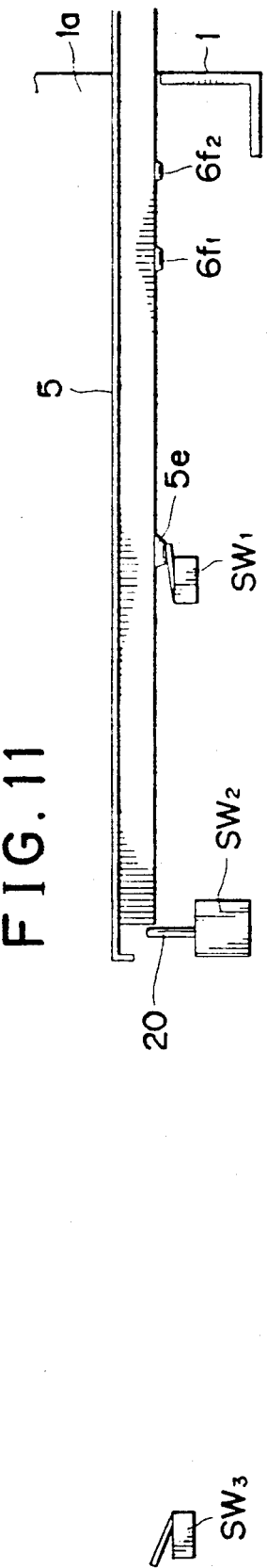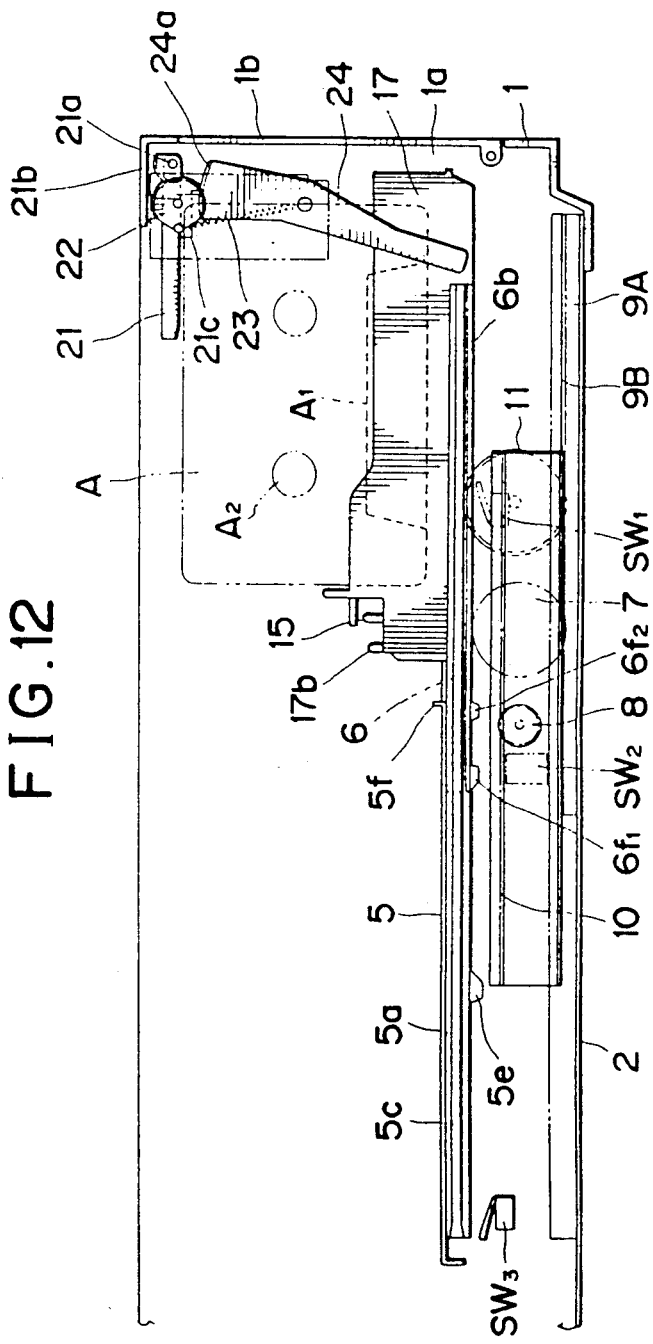

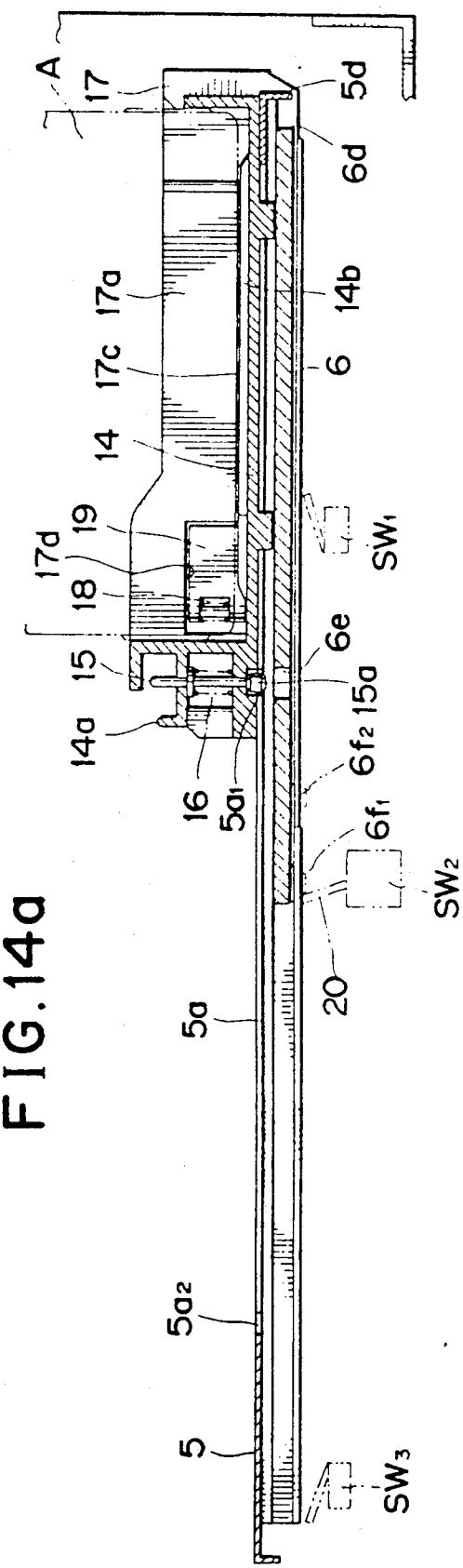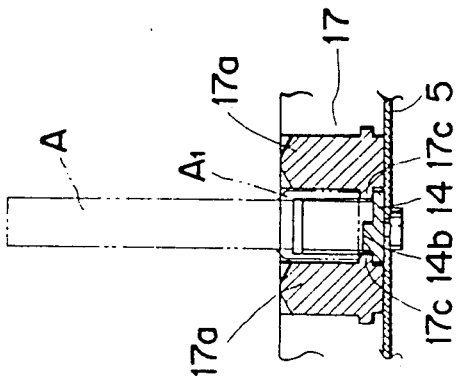
FIG.14a
FIG.14b

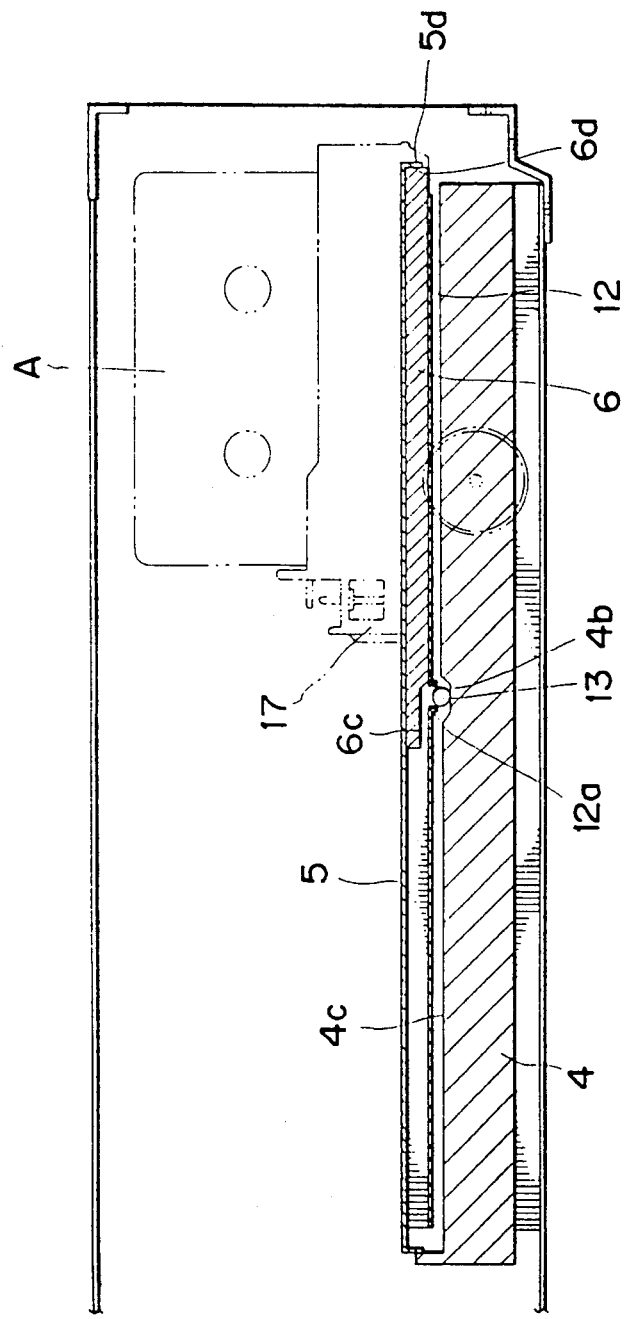

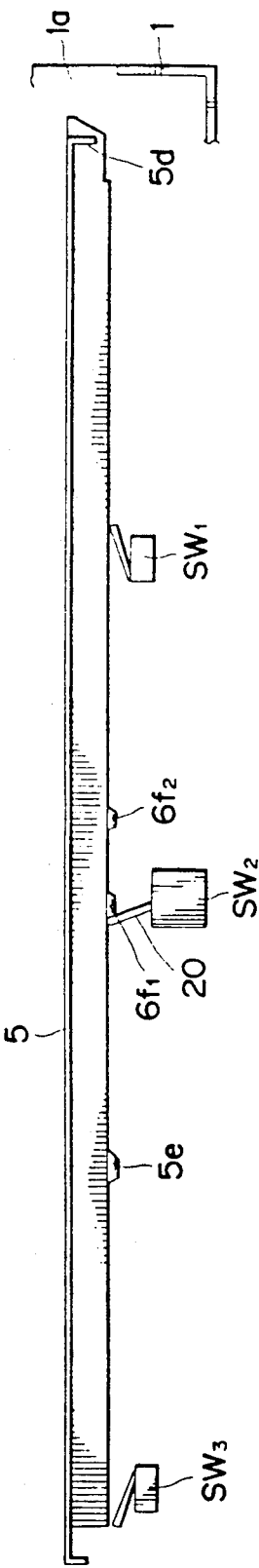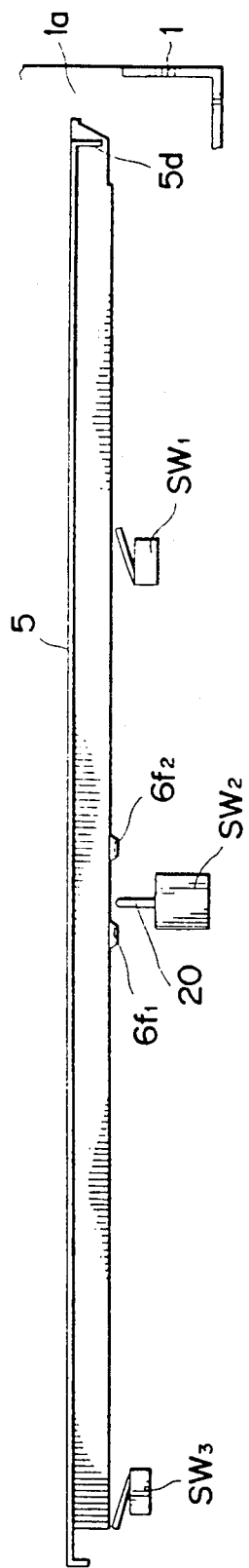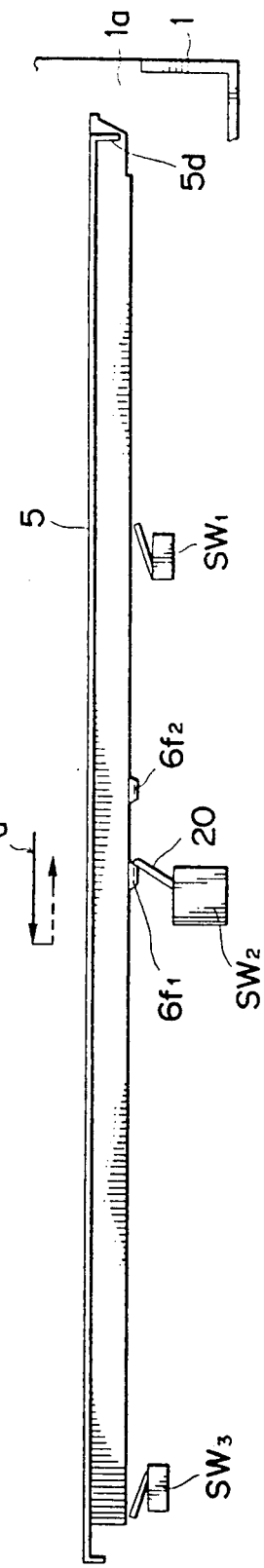

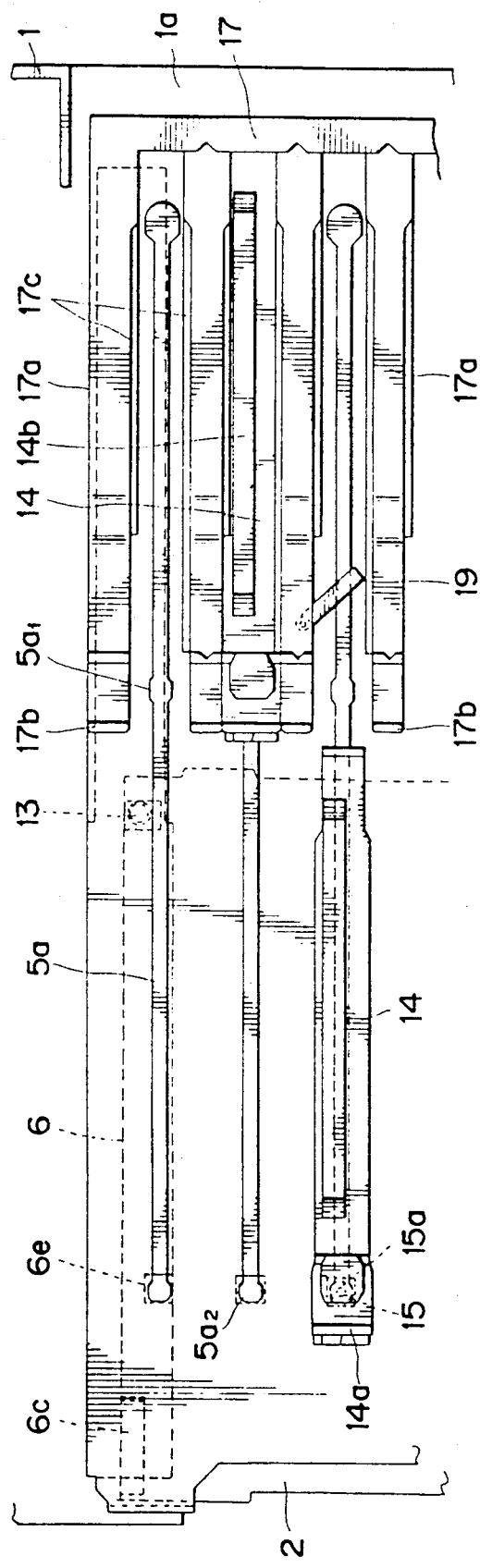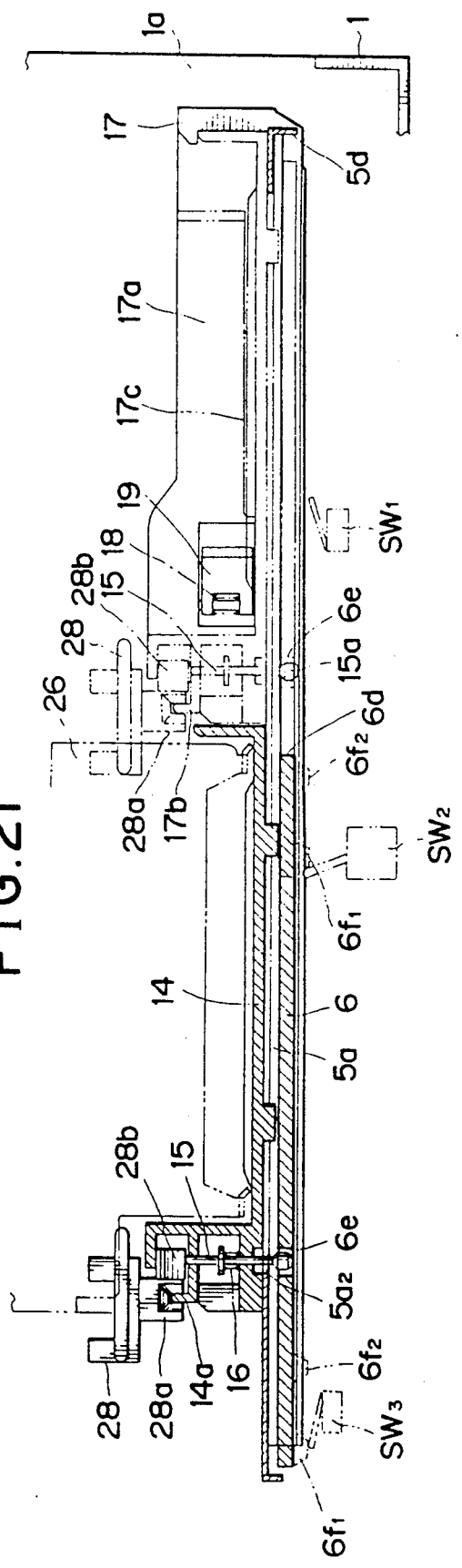

CASSETTE CHANGER FOR TAPE PLAYER

BACKGROUND OF THE INVENTION

1. Field of the Invention

This invention relates to a tape player for recording sounds on or reproducing recorded sounds from a tape of a tape cassette, and more particularly to a cassette changer for a tape player of the type mentioned wherein one of a plurality tape cassettes accommodated therein is selectively set on a tape driving mechanism.

2. Description of the Prior Art

A cassette changer for a tape player is already known wherein a holder in which a plurality of tape cassettes are removably accommodated in a row is moved relative to a tape driving mechanism for driving a tape of a tape cassette selectively set thereon to perform recording or reproduction of sounds on or from the tape. When it is intended to record or reproduce sounds on or from a tape of a particular one of the tape cassettes, at first either one of the holder and the tape driving mechanism is moved relative to the other in a direction along the row of the tape cassettes to a position at which the particular cassette opposes a tape pushing out mechanism. Then, the cassette is pushed out from the holder and set in position on the tape driving mechanism by the pushing out mechanism. Thereafter, a door for a tape cassette insertion opening formed in a wall of the holder is closed to prevent another tape cassette from being inserted by way of the cassette insertion opening to the position of the holder from which the particular cassette has been pushed out.

In order to remove some of the tape cassettes from the holder or mount new tape cassettes in position on the holder, the holder is moved to a predetermined position at which a tape cassette is removed from or mounted in position onto the holder.

The conventional cassette changer for a tape player described above has such various drawbacks as described below. In particular, where the holder is mounted for movement relative to the tape driving mechanism, a space greater than twice the dimension of the holder in the direction of the row of the tape cassettes is required because the holder must be able to move between a position at which a tape cassette at an end position of the row is selected and another position at which another tape cassette at the other end position of the row is selected. If it is intended to increase the number of tape cassettes to be accommodated in the holder, then the holder must have a correspondingly greater size, and the overall size of the tape player in which the holder is accommodated for movement is increased by twice such increment. Accordingly, sufficient miniaturization of the tape player cannot be anticipated unless the holder is disposed such that it may be exposed or projected outside from a body or housing of the tape player.

However, if the holder is exposed outside the tape player housing, then a tape within a tape cassette on the holder is likely to be soiled or the holder may collide with and damage some other instrument.

To the contrary, if it is attempted to construct the tape player such that the tape driving mechanism is mounted for movement relative to the holder, then a motor of a high output power is required to move the tape driving mechanism because the tape driving mechanism has a comparatively large weight with various mechanisms including a tape feeding mechanism for feeding a tape at a normal speed or at a high speed in a forward direction or in the reverse direction and various other mechanical parts such as a head and a motor. Besides, connection between such tape feeding mechanism and operation provided on a front panel of the player for operation of the tape feeding mechanism is complicated, and consequently, the tape player is liable to fail.

Whether the holder or the tape driving mechanism is mounted for movement relative to the other, when a tape cassette which has been in position on the tape feeding mechanism for recording or reproduction of a tape thereof is returned to the holder, the tape cassette is moved at a fixed speed between the tape feeding mechanism and the holder. Accordingly, in case the speed is excessively high, the tape cassette may jump out of the holder due to its interia. Or, if the tape cassettes are not arranged in regular order on the holder, the pushing out mechanism which may be provided fixedly on or relative to the tap driving mechanism may collide with some of such tape cassettes on the holder and consequently be prevented from moving in the direction of the row of the tape cassettes relative to the holder and hence to the tape cassettes. On the contrary, in case the speed is excessively low, much time is required until a tape cassette is returned from the tape driving mechanism into the holder and then a next tape cassette is set in position onto the tape driving mechanism, which may irritate an operator.

Further, since the pushing out mechanism and the holder are disposed for relative movement to each other, a very complicated mechanism is required to permit the holder to be moved to a position in which it is partially exposed outside to allow a tape cassette thereof to be manually removed or exchanged for another tape cassette while a tape of a particular tape cassette selectively picked up from the holder is being recorded or reproduced by the tape driving mechanism. It is difficult, however, to put such mechanism to practical use.

Accordingly, in such a cassette changer for a tape player as described above, normally the holder is mounted for movement relative to the tape driving mechanism, but while a tape of another tape cassette is being driven by the tape driving mechanism, the holder is prevented from moving by the pushing out mechanism or by a selecting mechanism for moving the holder relative to the tape driving mechanism to select a desired tape cassette or by some other mechanism. Consequently, during recording or reproducing operation of a tape cassette, the holder cannot actually be exposed outside the tape player to exchange another tape cassette on the holder. In other words, removal or exchanging of a tape cassette can normally be performed only when the tape player is at rest.

In order to remove a tape cassette from the holder, an operator must put its fingers into the holder to pick up the tape cassette. This, however, is a cumbersome operation. If a mechanism is provided to push a tape cassette to move to partly project forwardly from the holder, then the tape cassette may be handled readily, but such mechanism likely has a very complicated structure.

After removal or exchanging of some tape cassettes, the holder is returned to its home position in preparation for subsequent selection of a tape cassette thereon. However, if a tape cassette is mounted reversely on the holder in error with an exposed tape thereof directed in the opposite direction, which likely occurs, then it is moved, when it is selected, to the tape driving mechanism while maintaining its reverse orientation. However, the tape cassette cannot be set in position onto the tape driving mechanism but will cause an inadvertent trouble of the tape player such as jamming of the tape player mechanism.

A similar trouble of the tape player mechanism may occur if another tape cassette is inserted in error to the position of the holder from which a proper tape cassette has been picked up for recording or reproduction of a tape thereof. Such tape cassette inserted in error will interfere with the proper tape cassette when the proper tape cassette tries to return to its original position on the holder, and will thus cause jamming of the tape player mechanism. Such insertion of a tape cassette in error is likely to occur in case the door for the tape cassette insertion opening is opened by some means due to absence of a door locking mechanism or if the holder is moved to the outwardly exposed position by some reason.

Further, since such a conventional cassette changer for a tape player as described above only includes a single tape driving mechanism, continuous recording or reproduction of two or more tapes cannot be performed.

SUMMARY OF THE INVENTION

It is an object of the present invention to provide a novel cassette changer for a tape player wherein a tape cassette accommodating member and a tape driving mechanism are fixed relative to each other during selection of a tape cassette to eliminate such drawbacks of the conventional cassette changer wherein either one of the tape cassette accommodating member and the tape driving mechanism is mounted for movement relative to the other as described above.

It is another object of the present invention to provide a cassette changer for a tape player which has a comparatively small overall size and requires a comparatively low power for moving a tape cassette between a tape cassette accommodating member and a tape driving mechanism.

It is a further object of the present invention to provide a cassette changer for a tape player wherein a tape cassette accommodating member can be moved to a position partly exposed outside the tape player to facilitate removal or exchanging of a tape cassette.

It is a still further object of the present invention to provide a cassette changer for a tape player wherein removal or exchanging of a tape cassette can be performed without an error even while another tape cassette is being recorded or reproduced on a tape driving mechanism.

It is yet another object of the present invention to provide a cassette changer for a tape player which prevents a tape cassette from being inserted in error into a tape cassette accommodating member.

It is a yet further object of the present invention to provide a cassette changer for a tape player wherein a tape cassette can be inserted readily into a tape cassette accommodating member and smoothly moved between the tape cassette accommodating member and a tape driving mechanism.

It is a yet further object of the present invention to provide a cassette changer for a tape player wherein a tape cassette can be returned from a tape driving mechanism to a tape cassette accommodating member smoothly in a comparatively short period.

It is an additional object of the present invention to provide a cassette changer for a tape player which permits continuous or reproduction of tapes of two or more tape cassettes on the tape player.

In order to attain the objects, according to the present invention, there is provided a cassette changer for a tape player which comprises a plurality of cassette receiving members each for removably receiving a tape cassette thereon, an accommodating member for receiving the cassette receiving members in a row thereon, a selectively actuating means for selectively moving one of the cassette receiving members from a home position on the accommodating member to a transfer position outside the accommodating member, a tape driving mechanism mounted in a fixed relationship with respect to the accommodating member for receiving a tape cassette thereon and driving a tape on the tape cassette, and a carrier for receiving a tape cassette from a selected one of the cassette receiving members moved to the transfer position and setting the tape cassette in position onto the tape driving mechanism.

In the cassette changer, a particular one of tape cassettes on the accommodating member which is to be played on the tape driving mechanism is selectively moved from the home position to the transfer position by and togehter with that one of the cassette receiving members on the accommodating members on which the particular tape cassette is received so that the particular cassette is transferred from the cassette receiving member to the carrier, and then, the carrier transports the particular tape cassette and sets it in position onto the tape driving mechanism. Accordingly, neither of the accommodating member and the tape driving mechanism need be mounted for movement relative to the other for selection of a tape cassette nor for transportation of a tape cassette between them. Therefore, such spacing as required for movement of a holder in the conventional cassette changer described above can be eliminated, and such a great driving power as required for movement of a tape driving mechanism is not required. Besides, a complicated connecting mechanism between the tape driving mechanism and operating buttons or the like for operation the tape driving mechanism is not required.

Means may be provided for arresting the selected cassette receiving member at the transfer position until the tape cassette is returned from the carrier to the selected cassette receiving member in the transfer position. Such means provides mechanical storage of the position of the cassette receiving member. Thus, even if electric storage is lost by disconnection of the electric power, the tape cassette can be returned to the corresponding cassette receiving member and hence to the original location on the accommodating member. Accordingly, any possible trouble such as mechanical jamming which may be caused by loss of storage can be prevented.

Preferably, the cassette changer additionally comprises a detecting means provided on the carrier for operation by the selected one of the cassette receiving members moved from the home position to the transfer position, and a detecting switch providing on the carrier for detecting a position of the carrier. The single detecting means detects to which location the tape cassette to be played or being played on the tape driving mechanism belongs. Meanwhile, the carrier can be stopped arbitrarily in response to a position signal from the detecting switch.

A detecting means may be provided on the selectively actuating means for detecting that each of the cassette receiving members is at the home position and that each of the cassette receiving members arrives, during movement thereof toward the home position, at an intermediate position spaced by a predetermined distance from the home position, and the selectively actuating means may move, when the selected one of the cassette receiving members is to be returned from the transfer position to the home position, the selected cassette receiving member at a first speed to the intermediate position and then at a second speed lower than the first speed to the home position. Where the speed of the cassette receiving member is controlled in this manner, such a phenomenon that the tape cassette may jump out of the cassette receiving member or the tape cassettes may be brought out of a well aligned condition can be prevented, and a resultant possible trouble can be prevented. Besides, an excessively long waiting time can be eliminated.

Preferably, the accommodating member has a plurality of partition walls each adjacent ones of which define therebetween a cassette receiving spacing for receiving one of the cassette receiving members for movement therein, and the cassette changer further comprises an aligning wall provided on each of the cassette receiving members and the partition walls, and an aligning member mounted on the carrier for engaging, upon movement of the carrier, with the aligning walls to put the aligning walls in an aligned condition on a straight line. When the accommodating member and the cassette receiving members are positioned relative to each other by way of the aligning walls, the selectively actuating means can selectively move one of the cassette receiving members smoothly from the home position to the transfer position.

The cassette changer may further comprise an arresting means for arresting each of the cassette receiving members at each of the home position and the transfer position with respect to the accommodating member, and a cancelling means for selectively cancelling the arrested condition of one of the cassette receiving members at the home position or at the transfer position with respect to the accommodating member to permit the selectively actuating means to move the one cassette receiving member from the transfer position to the home position or from the home position to the transfer position. Since each of the cassette receiving members is arrested at either of the home position and the transfer position, the cassette receiving members are always held in position with respect to the accommodating member. Further, the accommodating member may have a plurality of partition walls each adjacent ones of which define therebetween a cassette receiving spacing for receiving one of the cassette receiving members for movement therein, and each of the cassette receiving members and the partition walls may have an aligning wall formed thereon while the cancelling means is mounted on the carrier and also acts to engage, upon movement of the carrier, with the aligning walls to put the aligning walls in an aligned condition on a straight line.

The cassette changer may further comprise an additional tape driving mechanism mounted in a fixed relationship with respect to the accommodating member, the two tape driving mechanisms being disposed in a substantially symmetrical relationship on the opposite sides of the accommodating member in the second position, and an additional carrier for receiving a tape cassette from a second selected one of the cassette receiving members moved to the transfer position and setting the tape cassette in position onto the additional tape driving mechanism. Where the two tape driving mechanisms and associated carriers are provided, continuous recording or reproduction of two tape cassettes can be carried out smoothly with the tape player.

Preferably, the accommodating member is mounted for movement between a first position in which the accommodating member is exposed outside a housing of the tape player to allow tape cassettes to be received into or removed from the cassette receiving members and a second position in which the accommodating member is accommodated in the housing, the housing having an opening formed therein for passing the accommodating member therethrough. The selectively actuating means acts to selectively move one of the cassette receiving members perpendicularly to the row of the cassette receiving members from the home position to the transport position while the carrier is mounted for movement in parallel to the row of the cassette receiving members from and to the tape driving mechanism along a side of the accommodating member in the second position remote from the opening of the housing. At the first position of the accommodating member, tape cassettes can be removed readily from the accommodating member and other tape cassettes can be accommodated readily onto the accommodating member. Besides, such removal or accommodation of tape cassettes can be carried out even during playing of a tape cassette since the accommodating member can be moved independently of the carrier and the accommodating member at the first position and various elements thereon do not interfere with the carrier. Accordingly, the tape cassette during playing need not be stopped in order to perform exchanging of tape cassettes or for some other object.

Preferably, the accommodating member has a plurality of cassette receiving sections for removably receiving in a row therein a plurality of tape cassettes each of which has a thinner portion and a thicker portion adjacent a tape exposing wall along which a tape is exposed outside the tape cassette, and each of the cassette receiving sections is defined by a pair of receiving portion spaced by a greater distance than the thickness of the thinner portion of a tape cassette for supporting the opposite sides of the thinner portion of a tape cassette thereon and a pair of partition walls spaced by a distance substantially equal to the thickness of the thicker portion of a tape cassette for supporting the opposite sides of the thicker portion of a tape cassette thereon, each of the cassette receiving members being received for movement in one of the cassette receiving sections. Each tape cassette is thus supported suitably in an appropriate posture by a pair of receiving portions and a pair of partition walls, which assures proper handling of the tape cassette by the cassette changer. Besides, when it is introduced into the inside of the tape player, it will not move inadvertently and hence will produce no rattling sounds of reel hubs therein.

Preferably, the accommodating member is formed so as to receive thicker portions of a plurality of tape cassettes in a row thereon, and the cassette changer further comprises a passage permitting means provided intermediately of a path of the accommodating member from the first to the second position for permitting only thinner portions of tape cassettes to pass therethrough. The cassette changer may further comprise a door operatively connected to the accommodating member such that the door opens the opening when the accommodating member moves from the first to the second position, but the door closes the opening when the accommodating member moves from the second to the first position, and the passage permitting means may be provided on the door. In case a tape cassette is accommodated in a wrong orientation on the accommodating member, introduction thereof into the inside of the tape player is prevented by the passage permitting means which prevents the thicker portion of the tape cassette from passing therethrough. Consequently, a tape cassette can always be set in position on the tape driving mechanism. When the accommodating member is at the first position, the door closes the opening of the housing to prevent the inside of the tape player from being observed by way of the opening and prevent admission of dust or foreign articles into the inside of the tape cassette.

The cassette changer may further comprise a plurality of cassette insertion preventing members each mounted on the accommodating member for movement such that the cassette insertion preventing member is normally accommodated in the accommodating member by a corresponding one of the cassette receiving members, but when the corresponding cassette receiving member is in the second position, the casstte insertion preventing member projects into a spacing from which the corresponding cassette receiving member has moved to prevent another tape cassette from being inserted into the spacing. Accordingly, overlapping insertion of two or more tape cassettes in error into a cassette receiving member can be prevented.

The above and other objects, features and advantages of the present invention will become apparent from the following description and the appended claims, taken in conjunction with the accompanying drawings.

BRIEF DESCRIPTION OF THE DRAWINGS

FIG. 11 is a schematic side elevational view showing a relationship between detecting switches and projections on the tape cassette accommodating member for operating the detecting switches;

FIG. 12 is a side elevational view showing the tape cassette accommodating member at its home position;

FIG. 14a is a sectional view of the tape cassette accommodating member at the home position, and FIG. 14b is an enlarged partial sectional view of the tape cassette accommodating member;

FIG. 15 is a side elevational sectional view showing the tray driving plate and the tray base plate when the tape cassette accommodating member is at the home position;

FIGS. 16 to 18 are schematic side elevational views showing different relative positions of the detecting switches and the projections on the tape cassette accommodating member;

FIGS. 20 and 21 are a partial plan view and a sectional view, respectively, showing, in an enlarged scale, the tape cassette accommodating member at the position shown in FIG. 19;

DESCRIPTION OF THE PREFERRED EMBODIMENT

Figure 1:
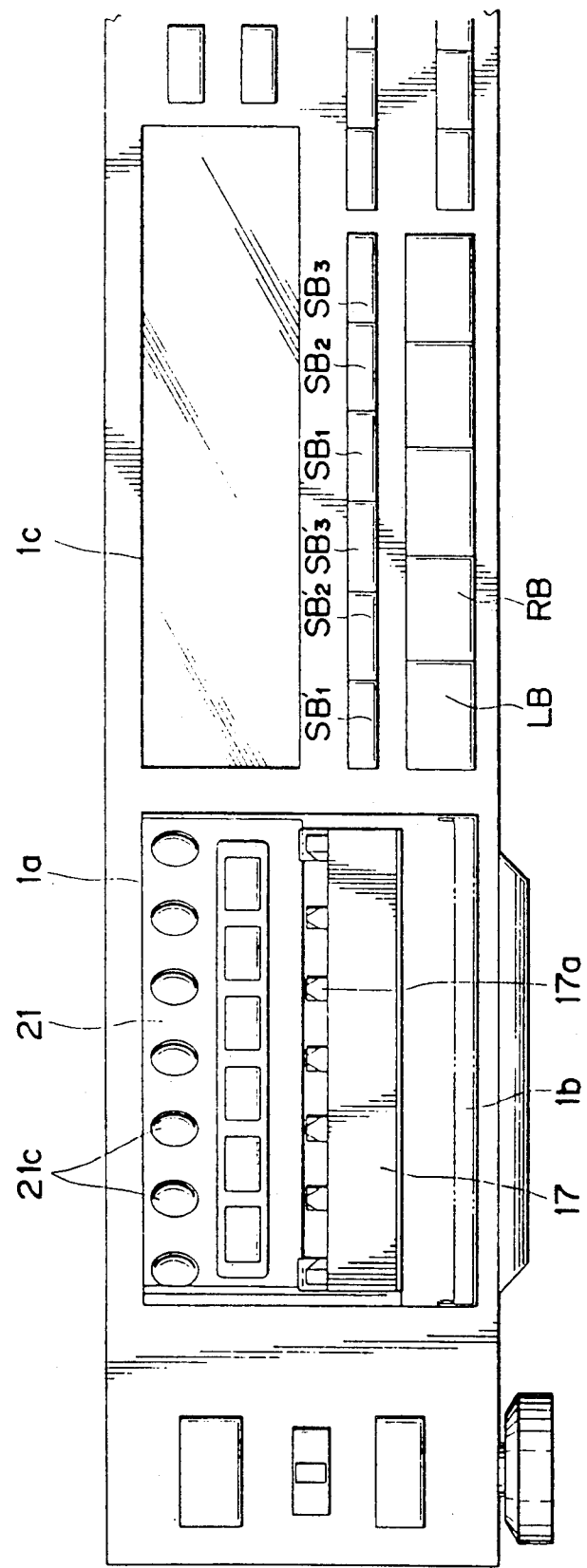
FIG. 1 is a partial front elevational view of a tape player in which a cassette changer according to the present invention is incorporated.
Figure 7:
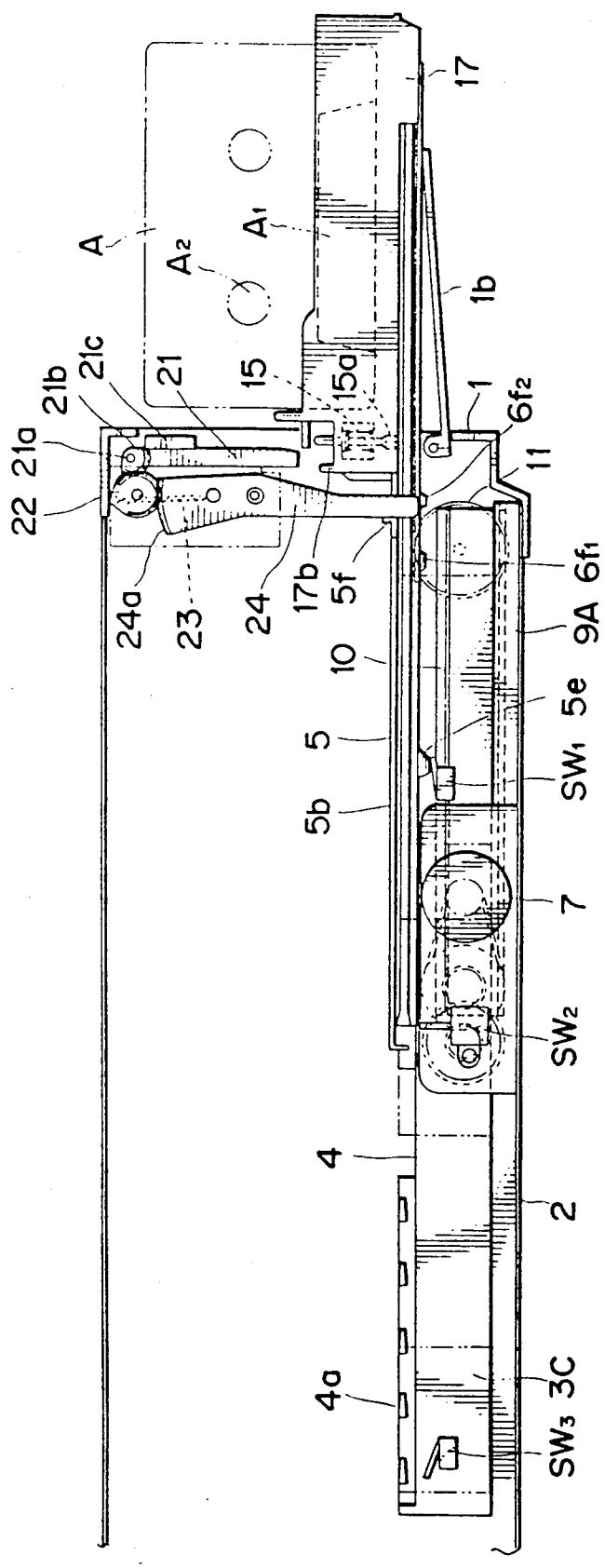
FIG. 7 is a side elevational view showing the tape cassette accommodating member at the position shown in FIG. 3.

Referring first to FIG. 1, there is shown a tape player in which a cassette changer according to the present invention is incorporated. The tape player shown includes a front panel 1 having a door 1b mounted for pivotal motion thereon to open or close a loading window 1a formed in the front panel 1. A chassis 2 is secured to the front panel 1 as shown in FIG. 7.

Figure 2:
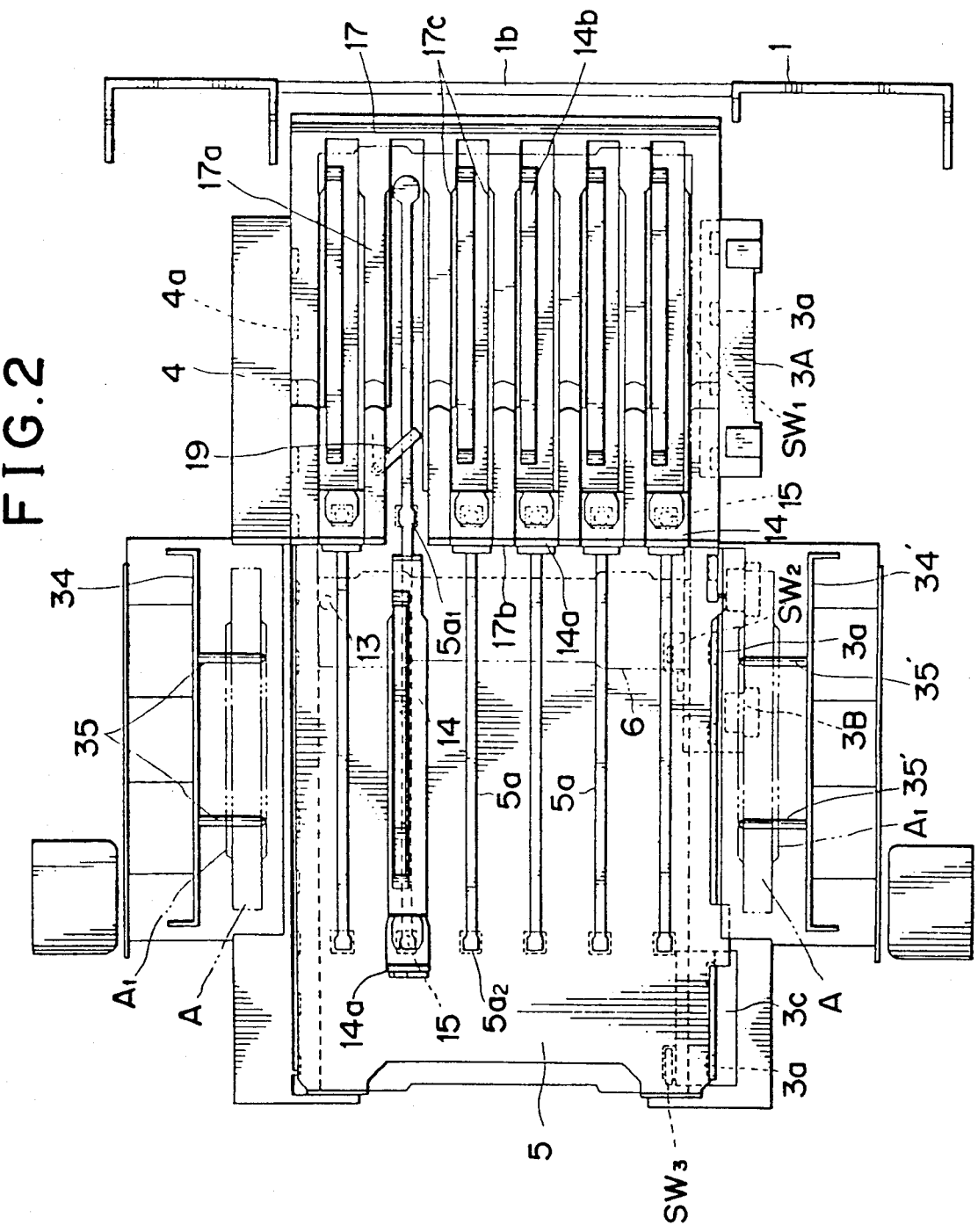
FIG. 2 is an enlarged plan view showing a tape cassette accommodating member of the cassette changer at its home position.
Figure 4:
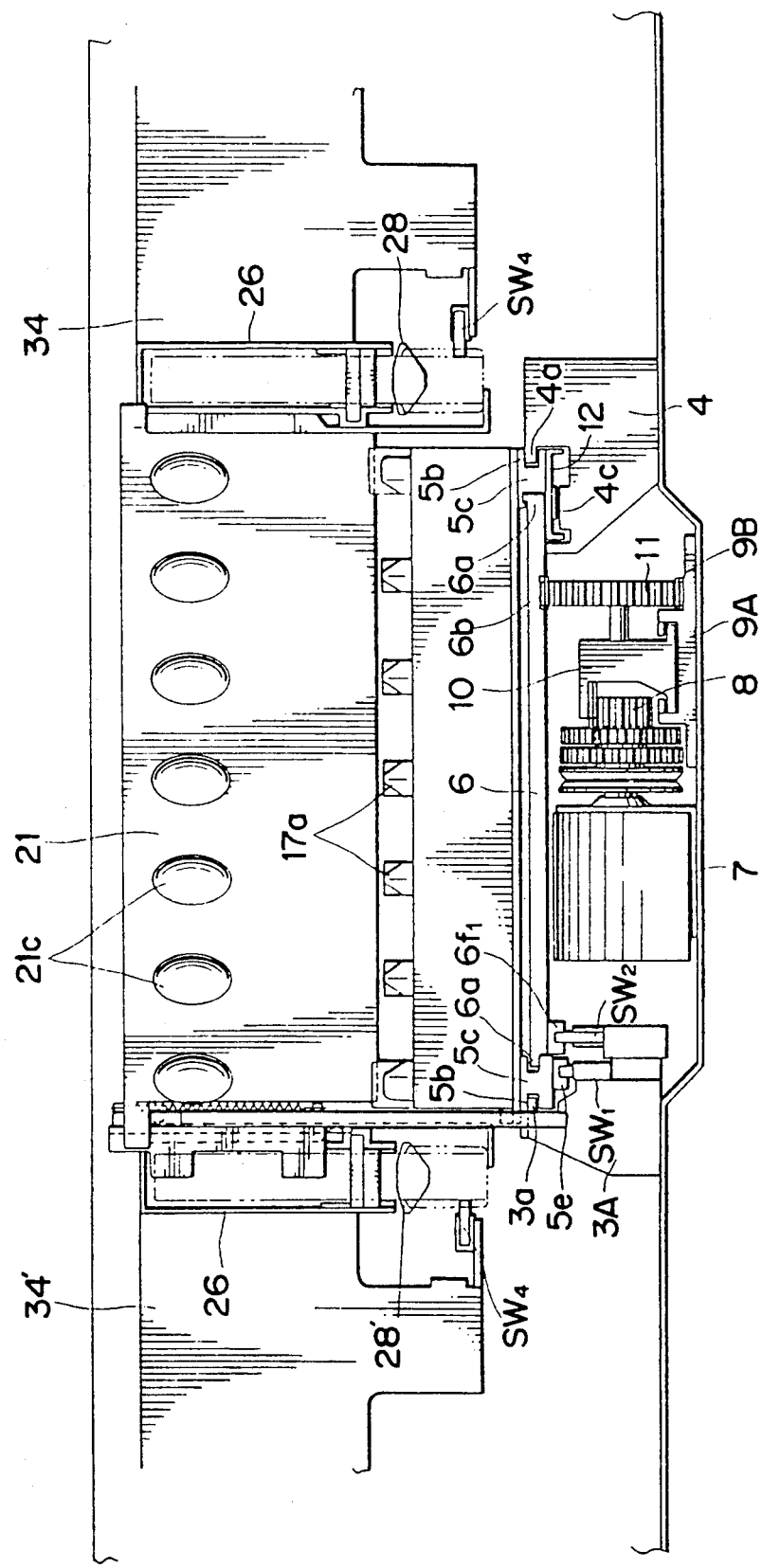
FIG. 4 is a front elevational view showing the tape player with the front panel removed.

Referring now to FIGS. 2 and 4, three guide members 3A, 3B and 3C and a further guide member 4 are mounted on the chassis 2. Each of the guide members 3A, 3B and 3C has two to four guide tabs 3a formed thereon while the guide member 4 has several guide tabs 4a formed thereon.

The guide tabs 3a and 4a of the guide members 3A, 3B, 3C and 4 are fitted in a pair of guide grooves 5b formed in the opposite left and right (lower and upper in FIG. 2) side faces of a tray base plate 5 so that the tray base plate 5 may be moved in the forward and backward directions, that is, in the leftward and rightward diections in FIG. 2. The tray base plate 5 has a plurality of, six in the embodiment shown, guide slits 5a formed in parallel to each other in the forward and backward directions therein. Each of the guide slits 5a has a pair of expanded portions $5a_1$ and $5a_2$ at the opposite front and rear ends, i.e., rightward and leftward ends in FIG. 2, thereof.

A pair of rails 5c are mounted at the opposite end portions of the tray base plate 5 and receive therein the opposite end portions 6a of a tray driving plate 6 so that the tray driving plate 6 may be moved in the leftward and rightward directions in FIG. 2, that is, in directions perpendicular to the plane of FIG. 4.

Figure 6:
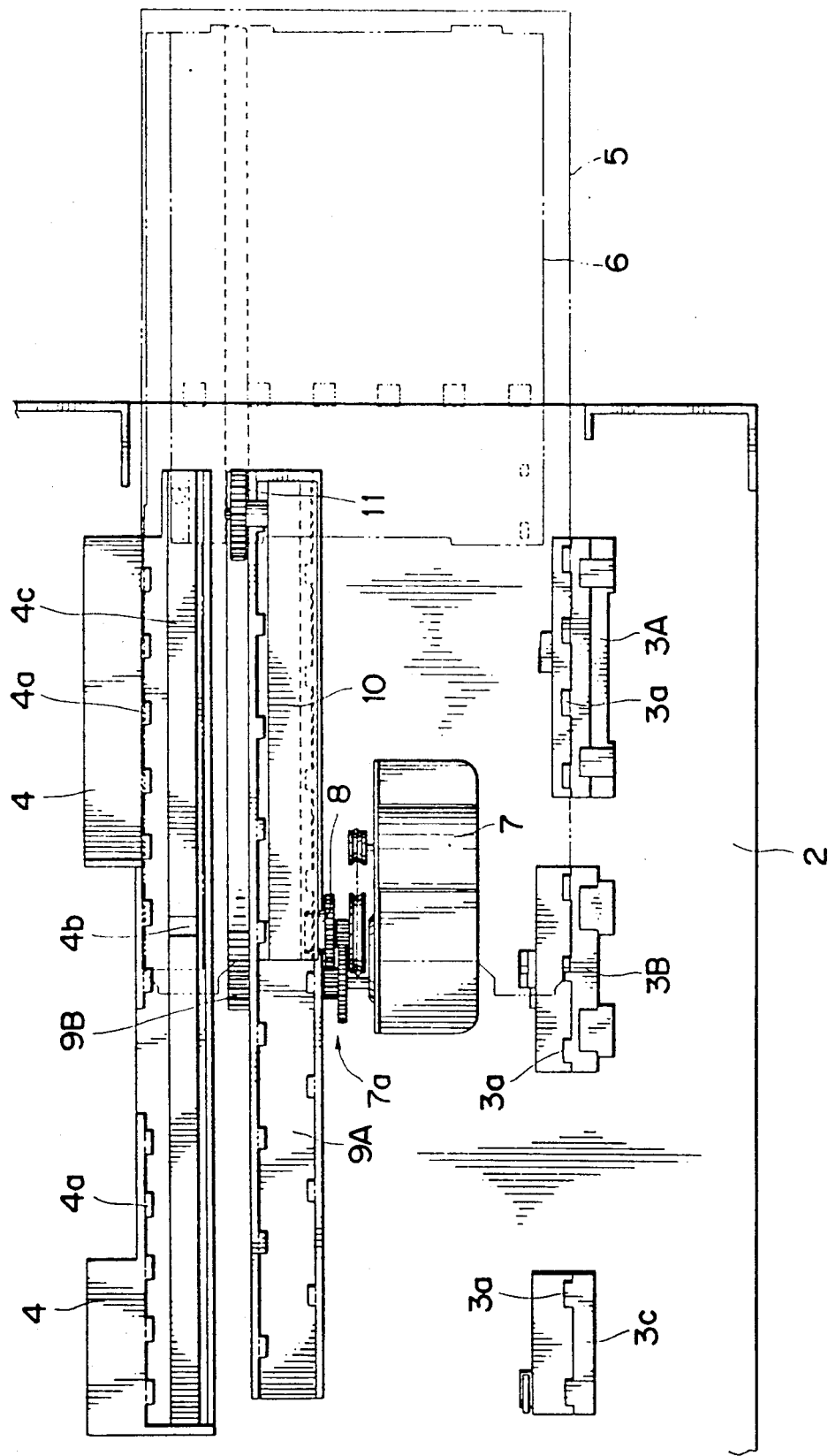
FIG. 6 is a plan view of a driving mechanism for a tray driving plate when the tape cassette accommodating member is at the position shown in FIG. 3.

Referring to FIGS. 4, 6 and 12, a motor 7 is mounted on the chassis 2, and rotation of the motor 7 is transmitted to a gear wheel 8 by way of a reduction gear 7a. The gear wheel 8 is held in meshing engagement with a rack 10 which is mounted for sliding movement in the forward and backward directions, that is, in the leftward and rightward directions in FIG. 6 on a slide base 9A mounted on the chassis 2. Another gear wheel 11 is supported for rotation on the rack 10 and normally held in meshing engagement with another rack 9B secured to the chassis 2 and also with a rack portion 6b of the tray driving plate 6.

Accordingly, when the motor 7 is energized, the gear wheel 8 is rotated at a reduced speed by the motor 7 to move the rack 10 and hence the gear wheel 11 in the leftward or rightward direction in FIG. 6. Thereupon, the gear wheel 11 is rotated due to meshing engagement with the rack 9B, and such rotation of the gear wheel 11 moves the tray driving plate 6 in the same direction due to meshing engagment of the gear wheel 11 with the rack portion 6b of the tray driving plate 6. In this instance, the tray driving plate 6 is moved by a distance equal to twice the distance over which the rack 10 is moved.

Figure 10:
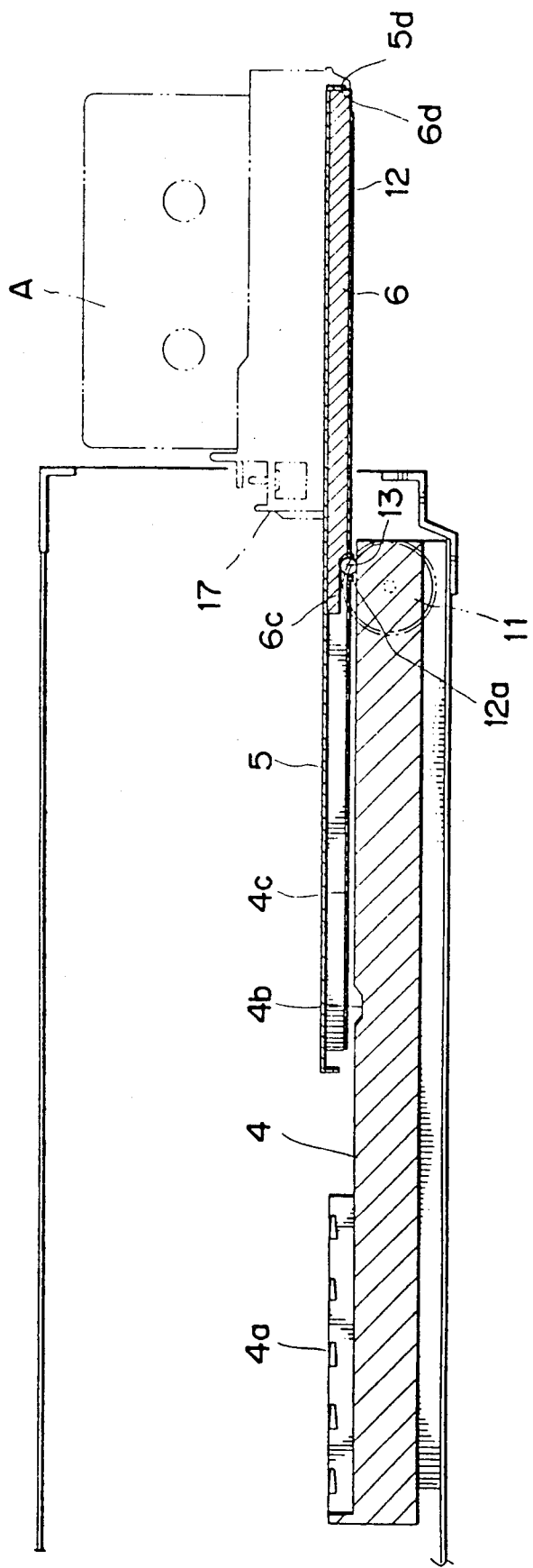
FIG. 10 is an enlarged side elevational sectional view showing a relationship between the tray driving plate and a tray base plate of the tape cassette accommodating member.
Figure 22:
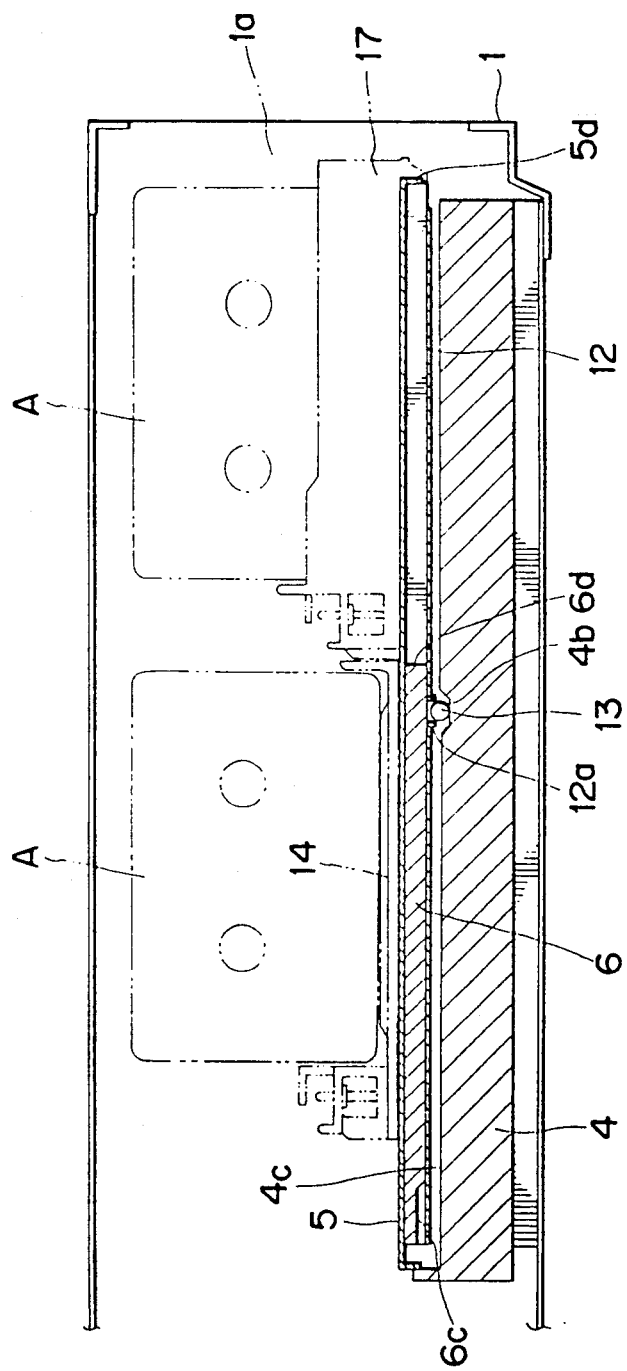
FIG. 22 is a side elevational sectional view showing a relationship between the tray driving plate and the tray base plate when the tape cassette accommodating member is at the position shown in FIG. 19.

Referring now to FIGS. 10, 15 and 22, an auxiliary plate 12 is secured to the tray base plate 5 and has a hole 12a perforated therein. A ball 13 is received in the hole 12a of the auxiliary plate 12 and held in engagement with an upper surface of the guide member 4. The guide member 4 has a recess 4b formed therein on a locus of sliding movement of the ball 13, and when the ball 13 is received in the recess 4b of the guide member 4, the tray driving plate 6 can slidably move on the ball 13 as seen in FIG. 22, and consequently, it is held out of interlocking relationship with the tray base plate 5 so that it can slidably move along the rails 5c on the tray base plate 5. On the other hand, when the tray driving plate 6 is moved to such a position as shown in FIG. 15 in which a recess 6c formed thereon is positioned just above the ball 13, the ball 13 is allowed to be received in the recess 6c, thereby to permit the auxiliary plate 12 and the tray base plate 5 to move rightwardly from the position shown in FIG. 15. Upon such rightward movement, the ball 13 is moved out of the recess 4b and then slidably rides on a flat face 4c of the guide member 4.

Thus, when the tray driving plate 6 is moved leftwardly from the position shown in FIG. 10, it moves the tray base plate 5 leftwardly until the ball 13 is reveived into the recess 4b of the guide member 4 as seen in FIG. 15. Then, when the tray driving plate 6 is moved rightwardly from the position shown in FIG. 15, it contacts at a right end thereof in FIG. 15 with a bent portion 5d of the tray base plate 5 to push the tray base plate 5 to move rightwardly. Thereupon, the ball 13 is received into the recess 6c of the tray driving plate 6 and moved out of the recess 4b to the flat face 4c of the guide member 4, thereby establishing an interlocking relationship between the tray driving plate 6 and the tray base plate 5.

Figure 13:
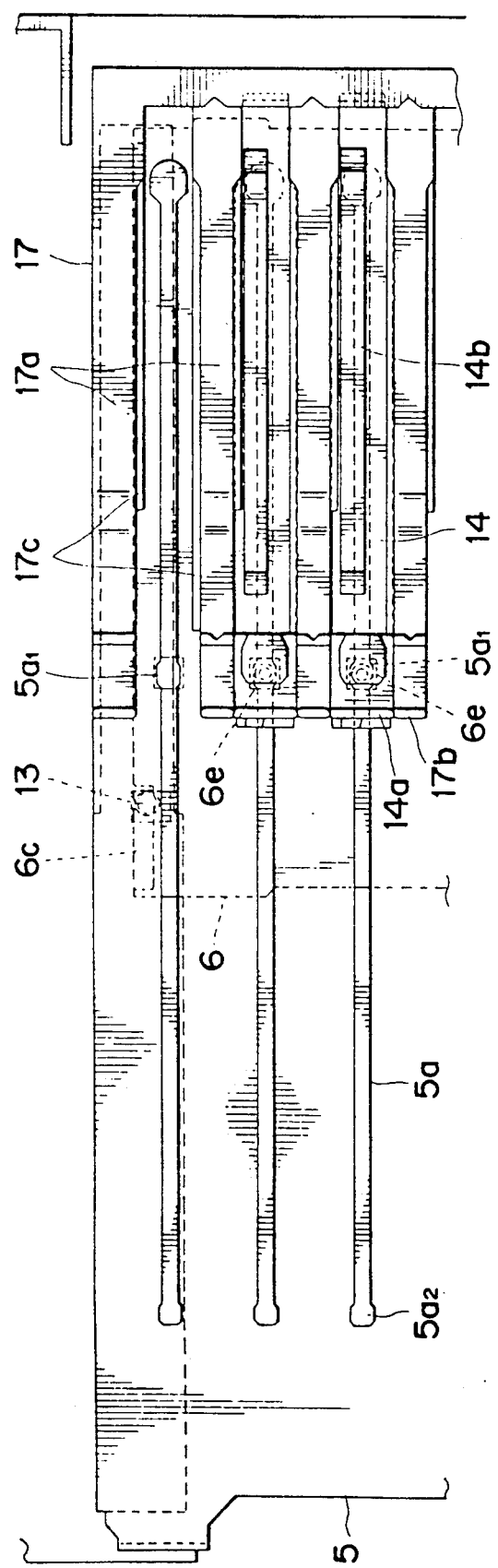
FIG. 13 is an enlarged partial plan view of the tape cassette accommodating member at the home position.
Figure 19:
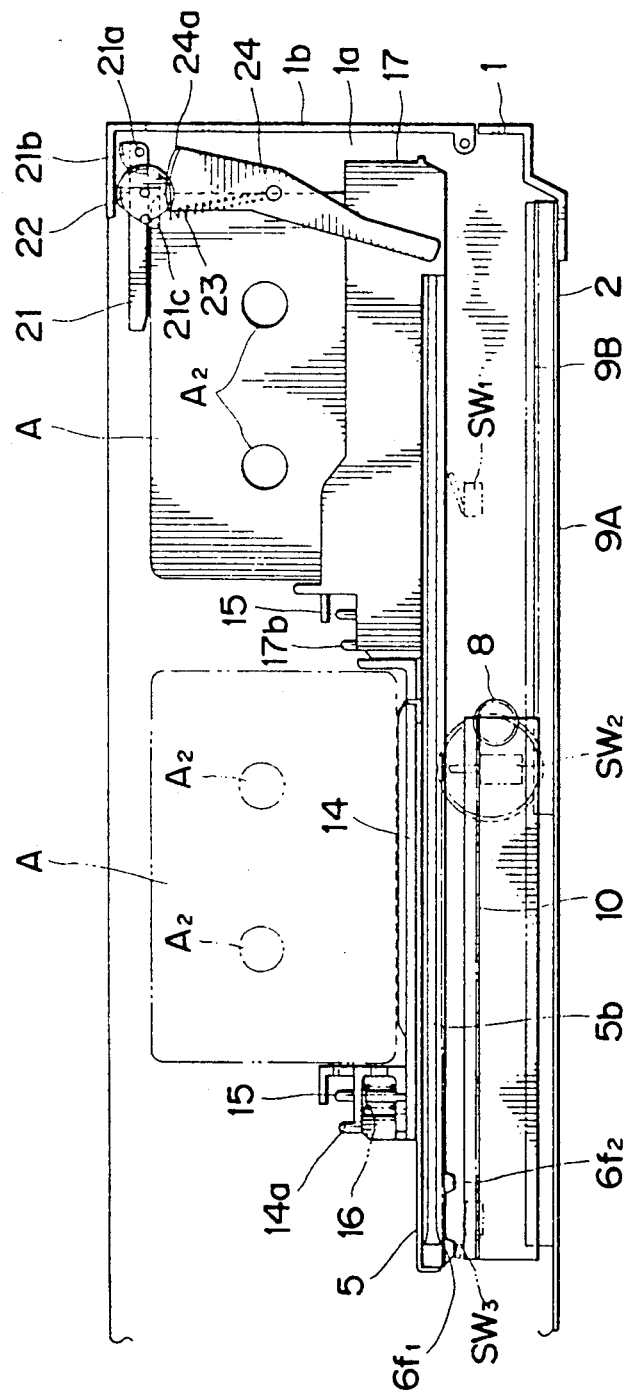
FIG. 19 is a side elevational view showing the tape cassette accommodating member when a case is at a transfer position.

Referring now to FIGS. 13, 14a and 14b, a cassette receiving member 14 is fitted for sliding movement in each of the guide slits 5a of the tray base plate 5. The cassette receiving member 14 is constructed to contact with the longitudinal opposite end faces of a tape cassette A to receive therein the tape cassette A with a tape exposing wall of the tape cassette A directed downwardly along which a tape therein is exposed to the outside of the tape cassette A.

A pin 15 having an expanded portion 15a formed at a lower end thereof is fitted for vertical axial movement in each of the cassette receiving members 14 and normally biased upwardly be means of a compression coil spring 16 so that the expanded portion 15a thereof may be fitted in the expanded portion $5a_1$ or $5a_2$ of the associated guide slit 5a to prevent the cassette receiving member 14 from moving along the guide slit 5a relative to the tray base plate 5.

Meanwhile, the tray driving plate 6 has a plurality of engaging holes 6e perforated one for each pin 15 at locations thereof at which the engaging holes 6e can be registered with the expanded portions 15a of the pins 15. Thus, when one of the pins 15 is pushed at the top thereof to move down, the expanded portion 15a thereof is moved downwardly out of the expanded portion $5a_1$ of the guide slit 5a into the engaging hole 6e registered with the expanded portion $5a_1$ to cancel the prevention of movement of the cassette receiving member 14. If, in this condition, the tray driving plate 6 is driven to move backwardly, that is, leftwardly in FIG. 13, the cassette receiving member 14 is moved in the same direction due to engagement between the expanded portion 15a of the pin 15 and the engaging hole 6e of the tray driving plate 6. Such movement of the cassette receiving member 14 will continue until the expanded portion 15a of the pin 15 comes to the position of the other expanded portion $5a_2$ of the guide slit 5a at which it is displaced out of the engaging hole 6e of the tray driving plate 6 and received into the other expanded portion $5a_2$ of the guide slit 5a as shown in FIG. 21 by the biasing force of the spring 16 to stop further movement of the cassette receiving member 14.

When the tray driving plate 6 is driven to move in the reverse direction from the position shown in FIG. 21, the cassette receiving member will be moved to the position at which the expanded portion 15a of the pin 15 thereon is received into the expanded portion 5$a_1$ of the guide slit 5a.

Each of the cassette receiving members 14 is mounted for sliding movement on a bottom face of a cassette accommodating section which is defined by a pair of adjacent ones of a plurality of partition walls 17a of an accommodating member 17 and has a width a little greater than the thickness portion $A_1$ of a tape cassette A. The accommodating member 17 as formed on the bottom face of each of the cassette accommodating sections a pair of ribs 17c for supporting the opposite edge portions of the tape exposing wall adjacent the thicker portion $A_1$ of a tape cassette A along which the tape in the tape cassette A is exposed outside. Thus, the tape cassette A is supported by the ribs 17c and the partition walls 17 of the cassette accommodating section. Accordingly, even when the accommodating member 17 is drawn out forwardly of the tape player or introduced into the inside of the tape player, the tape cassette will remain in a stabilized condition in the cassette accommodating section and will produce no rattling noises.

Meanwhile, each of the cassette receiving members 14 has a rib 14b formed thereon such that it may be positioned between the ribs 17c of the cassette accommodating section. The rib 14b is formed a little lower than upper faces of the ribs 17c of the cassette accommodating section such that, when the cassette receiving member 14 is positioned in the accommodating member 17, it may not be contacted with the tape exposing wall of a tape cassette A along which the tape in the tape cassette A is exposed outside. However, when the cassette receiving member 14 is moved away from the accommodating member 17, the tape exposing wall of the tape cassette A is contacted with and received by the rib 14b.

Each of the partitioning walls 17a of the accommodating member 17 and the cassette receiving members 14 has an aligning wall 17b or 17a formed at a rear end, i.e., leftward end in FIG. 13, thereof. The aligning walls 17b and 14a made a straight line extending in a direction of a row of tape cassettes accommodated on the accommodating member 17 when the expanded potions 15a of the pins 15 of the cassette receiving members 14 are fitted in the expanded portions 5$a_1$ of the guide slits 5a of the tray base plate 5.

Figure 8:
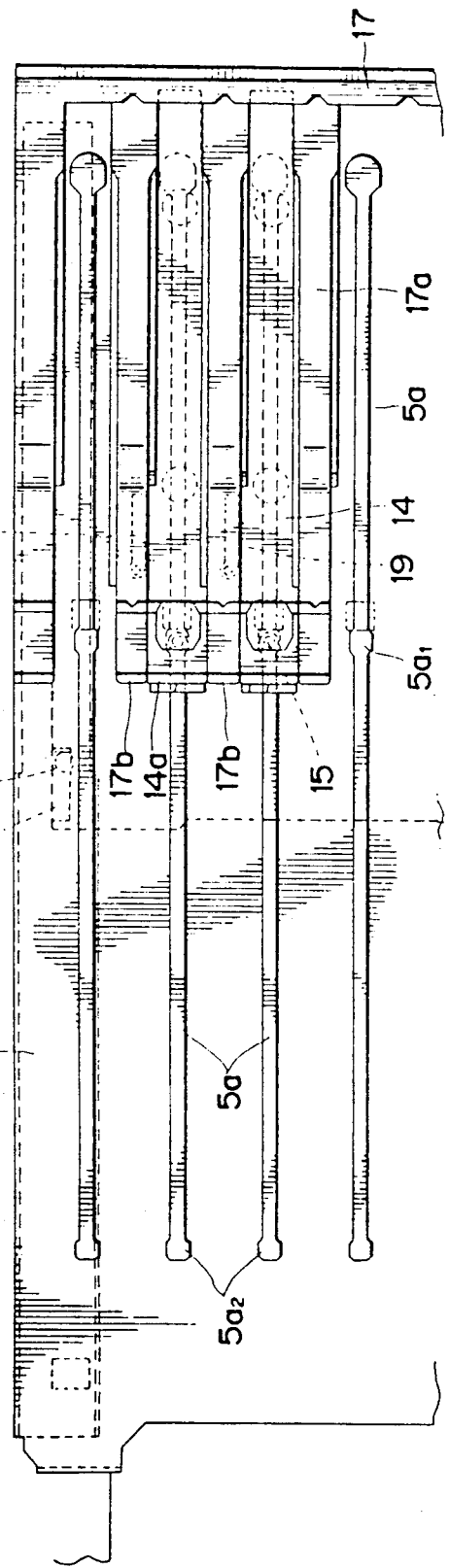
FIGS. 8 and 9 are a plane view and a sectional view, respectively, showing, in an enlarged scale, the tape cassette accommodating member at the position shown in FIG. 3.
Figure 9:
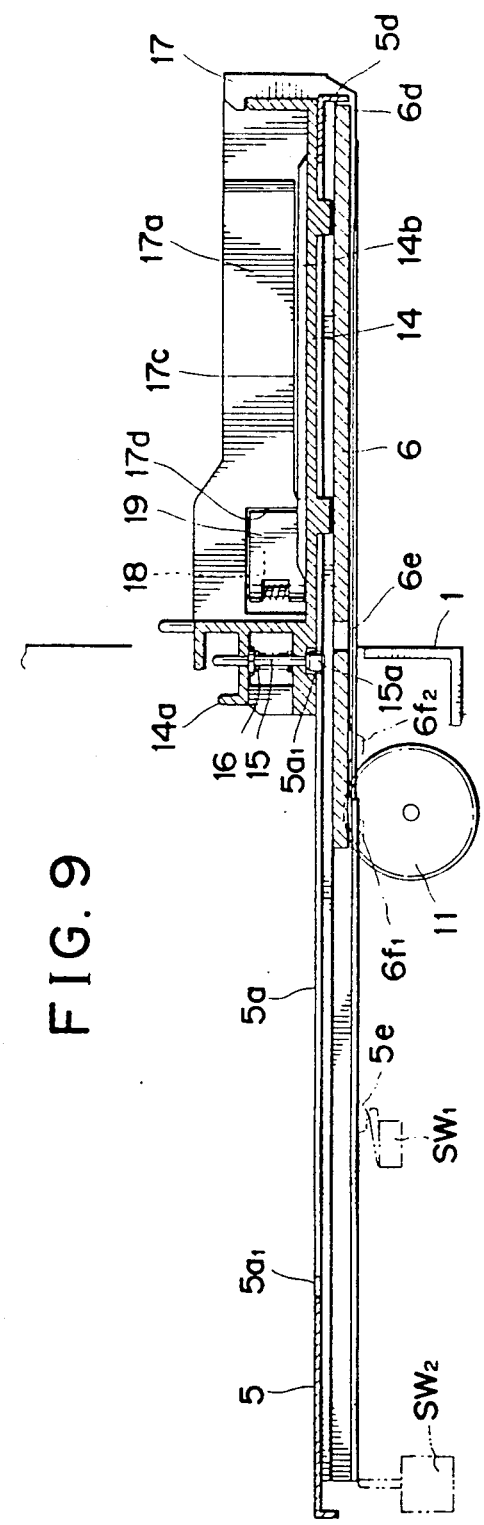

Referring to FIGS. 8, 9 and 14a, a projecting wall 19 is fitted in a recess 17d formed in each of the partition walls 17a and supported for pivotal motion between a position in which it is accommodated in the recess 17d and another position in which it projects from the partition wall 17a into the cassette accommodating section as shown in FIG. 20 and to which it is normally biased by a torsion coil spring 18. When the cassette receiving member 14 is introduced into the cassette accommodating section or spacing between the adjacent partition walls 17a, the projecting wall 19 is pushed by the cassette receiving member 14 and accommodated into the recess 17d of the partition wall 17a. On the contrary, if the cassette receiving member 14 is moved out from between the partition walls 17a, then the projecting wall 19 is projected by the biasing force of the torsion spring 18 to the location from which the cassette receiving member 14 has been moved out, thereby preventing another tape cassette A from being inserted into the spacing between the partition walls 17a.

Referring to FIGS. 2 and 11, three detecting switches $SW_1$, $SW_2$ and $SW_3$ are mounted on the guide members 3A, 3B and 3C, respectively. The detecting switch $SW_2$ is turned on in whichever direction of the leftward and rightward directions in FIGS. 2 and 11 an operating element 20 thereof is tilted.

Figure 3:
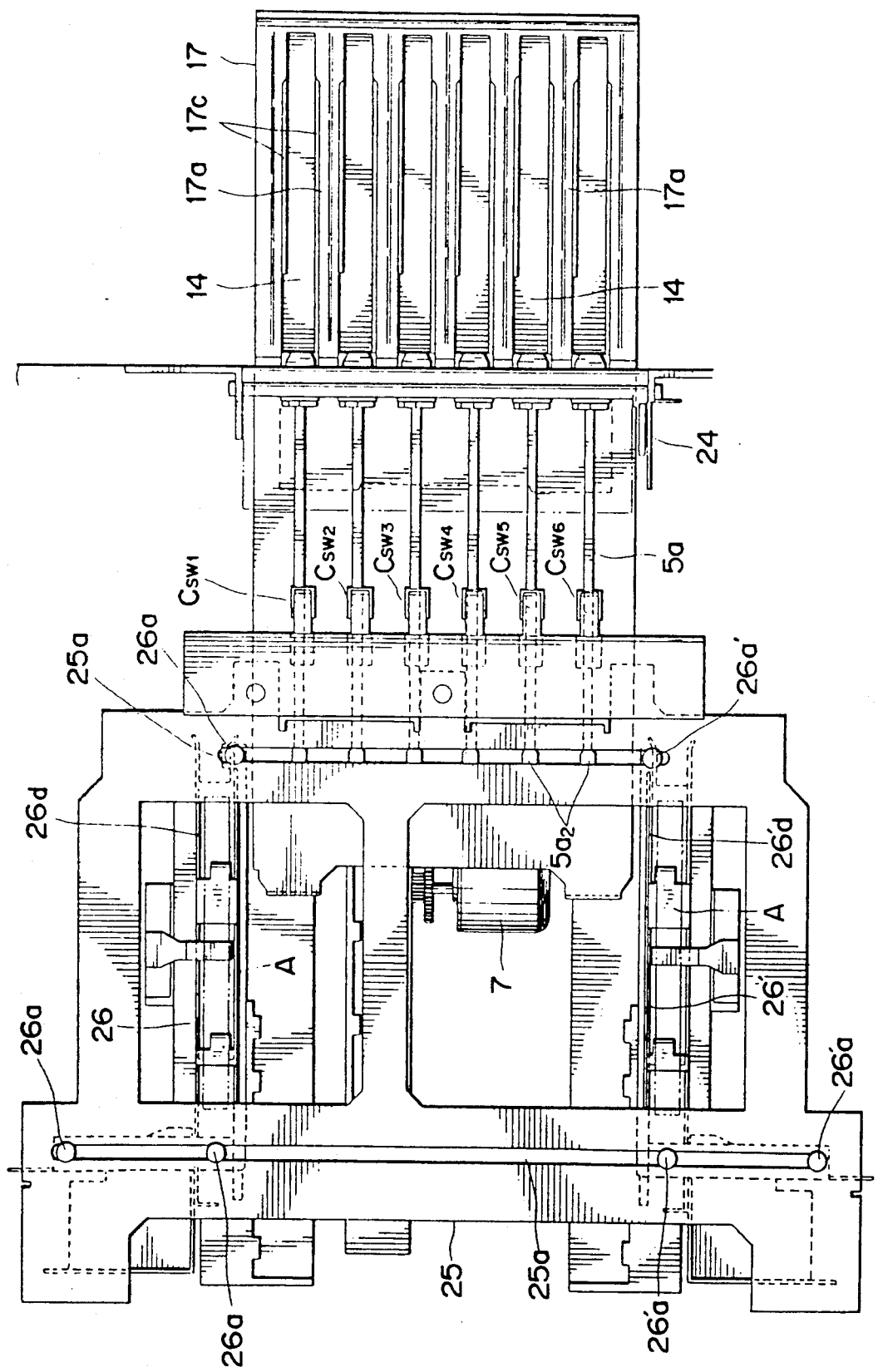
FIG. 3 is a similar view showing the tape cassette accommodating member at another position partly projected from a front panel of the tape player.

The detecting switch SW1 is disposed to be pushed and turned on by a projection 5e formed on a lower face of the tray base plate 5 as seen in FIG. 11 when the tray base plate 5 is moved to its outer limit position at which it projects outwardly from the front face of the front panel 1 through the loading window 1a as shown in FIG. 3. The outer limit position of the tray base plate 5 is thus detected by the detecting switch $SW_1$.

Figure 23:
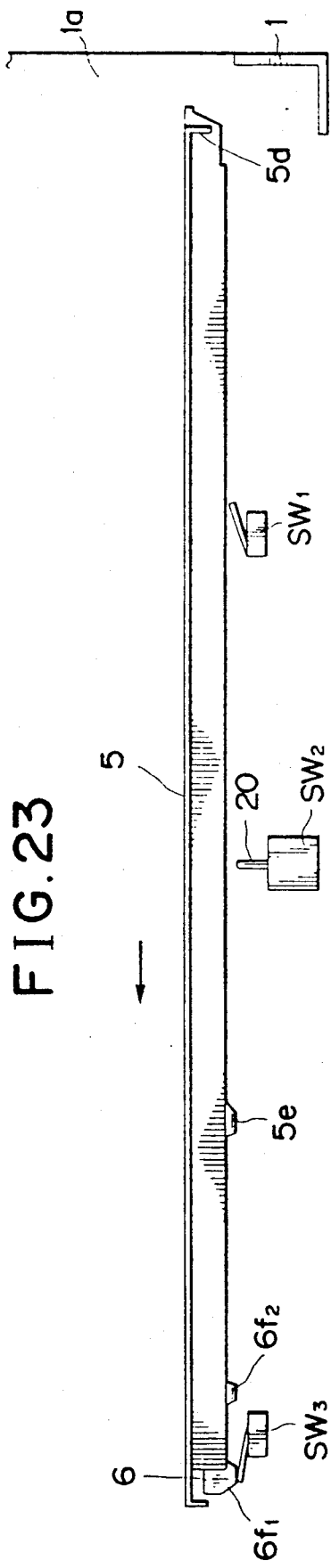
FIGS. 23 to 25 are schematic side elevational views showing a relationship between the detecting switches and the projections on the tape cassette accommodating member when it moves from the transfer position to the home position.

Meanwhile, the detecting switch $SW_2$ is disposed such that it is pushed and turned on by either of a pair of projections 6$f_1$ and 6$f_2$ formed on a lower face of the tray driving plate 6 as seen in FIGS. 16, 18, 24 and 25, and the detecting switch $SW_3$ is disposed such that it is operated and turned on by the projection 6$f_1$ as shown in FIG. 23.

Referring now to FIGS. 7 and 12, a second door 21 is supported for pivotal motion on the rear side of the loading window 1a of the front panel 1 by means of a shaft 21a fixed to the second door 21. A sector gear 21b is securely mounted on the shaft 21a and held in meshing engagement with an intermediate gear wheel 22 which is turn held in meshing engagement with a toothed portion 24a of a lever 24 mounted for pivotal motion around a fixed axis. The lever 24 is disposed for engagement with a projection 5f provided on the tray base plate 5.

A tension spring 23 extends between the lever 24 and the intermediate gear wheel 22 to bias the door 21 in the clockwise direction in FIG. 12 to open the loading window 1a by way of the intermediate gear wheel 22, sector gear 21b and shaft 21a. However, when the tray base plate 5 is moved to project forwardly from the loading window 1a to expose the tape cassette A thereon in front of the front panel 1, the lever 24 is pushed by the projection 5f of the tray base plate 5 to pivot in the counterclockwise direction against the biasing force of the spring 23 thereby to pivot the second door 21 in the counterclockwise the direction to such a position as shown in FIG. 7 in which the door 21 closes the loading window 1a so that the inside of the tape player may not be observed by the way of the loading window 1a.

Figure 5:
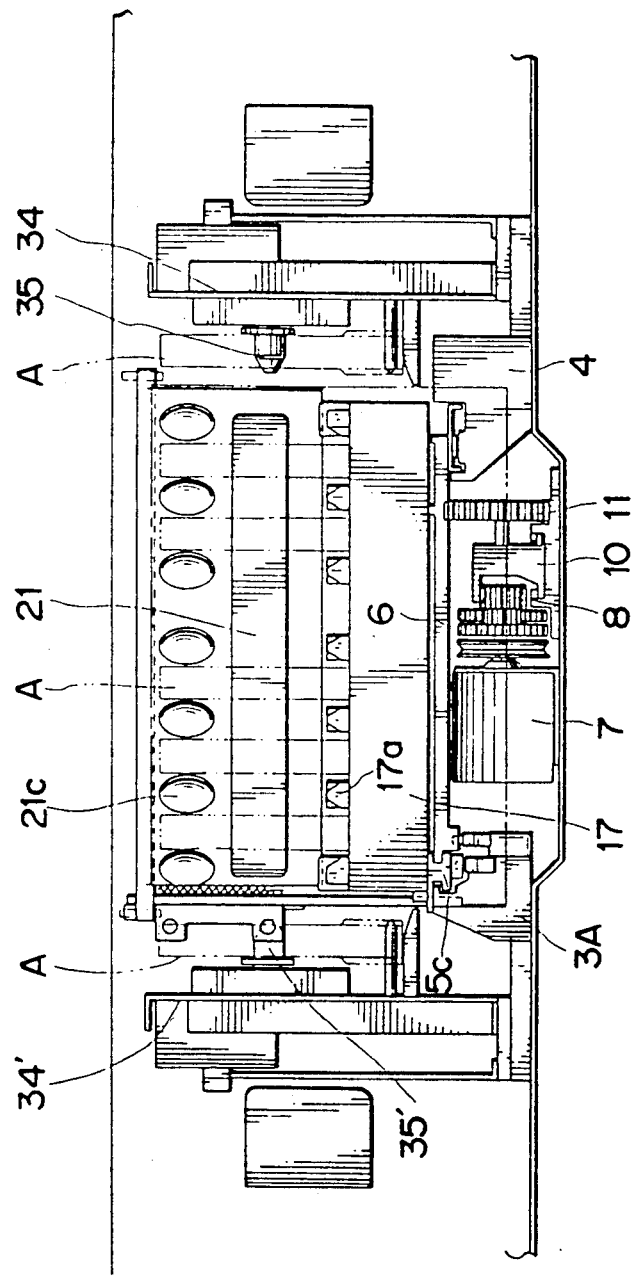
FIG. 5 is a similar view but showing, in a somewhat reduced scale, a relationship between tape cassettes and guide projections on a door of the tape player.

Referring to FIGS. 5 and 7, the door 21 has a plurality of guide projecting 21c formed on a front or outer face thereof in such a spaced relationship that a portion of a tape cassette A other than the thicker portion $A_1$ may pass between each adjacent ones of the guide projections 21c.

When the tray base plate 5 is drawn from the outer limit position into the inside of the tape player by way of the loading window 1a, the lever 24 is pivoted in the clockwise direction by the biasing force of the tension spring 23 thereby to pivot the door 21 in the clockwise direction to such a horizontal position as shown in FIG. 12. In the horizontal position of the door 21, the guide projections 21c on the door 21 permit only poritons other than the thicker portions $A_1$ of the tape cassettes A accommodated between the partition walls 17a of the accommodating member 17 to pass therebetween, or more particularly, edge portions of the tape cassettes A remote from the thicker portions $A_1$ can individually pass between the guide projections 21c.

Accordingly, if a tape cassette A is accommodated in the accommodating member 17 with the tape exposing wall thereof directed upwardly along which the tape in the tape cassette A is exposed outside, that is, with the thicker portion $A_1$ thereof positioned on the upper side, then the corresponding adjacent guide projections 21c interfere with the thicker portion $A_1$ of the tape cassette A to prevent passage of the cassette A. Consequently, introduction of the tape cassette A in error into the tape player is prevented.

Figure 26:
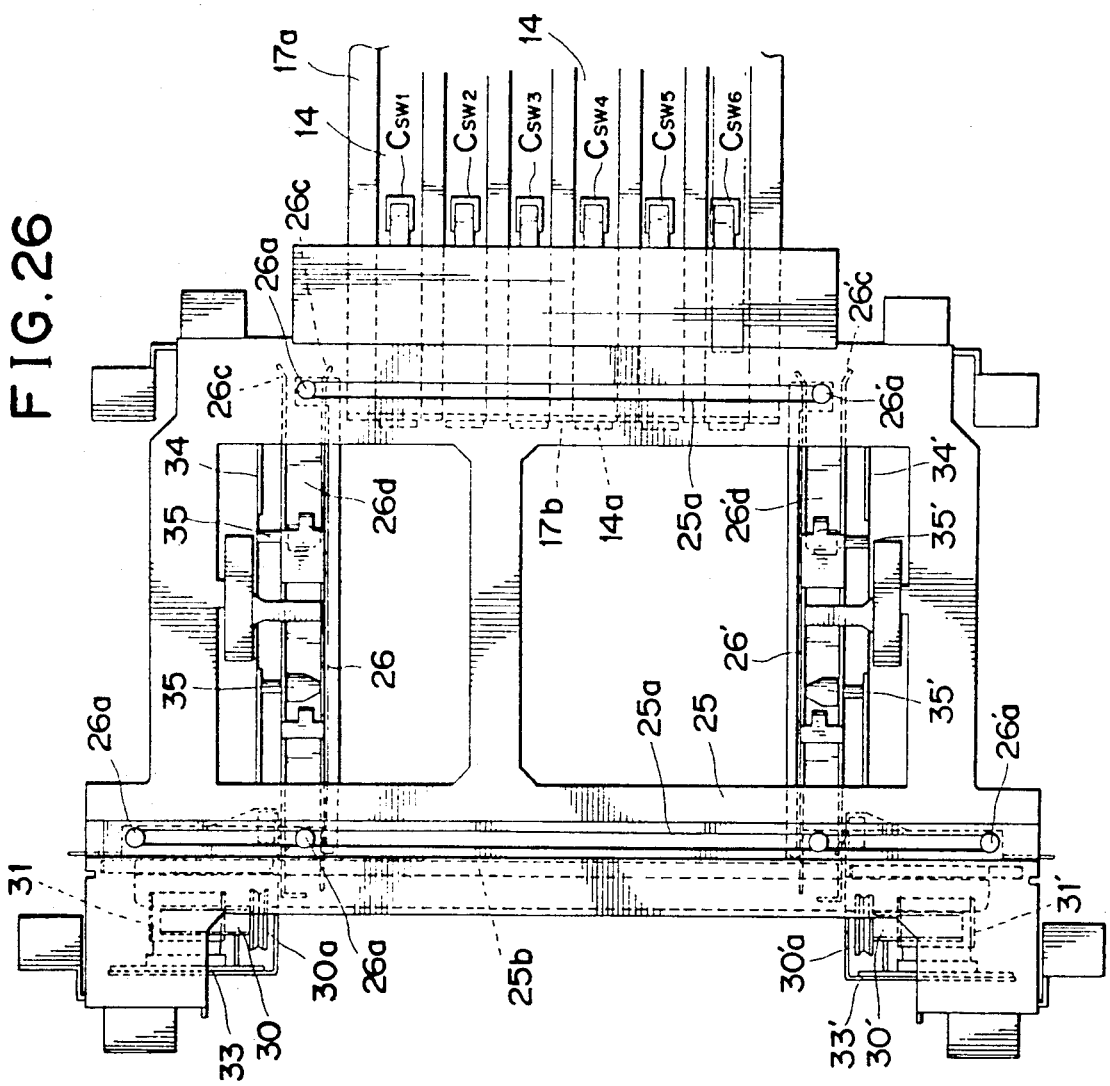
FIG. 26 is a plan view showing a carrier operating mechanism when a carrier contacts with a tape feeding chassis.

Referring now to FIGS. 3 and 26, a rail member 25 is disposed above the chassis 2, and a pair of rail slots 25a are formed in the rail member 25 and extend in a direction perpendicular to the guide slits 5a of the tray base plate 5. A pair of carriers 26 and 26' are disposed for leftward and rightward movement, i.e., upward and downward movement in FIGS. 3 and 26, along the rail slots 25a of the rail member 25. In particular, each of the carriers 26 has three guide pins 26a or 26a' two of which are fitted for sliding movement in a rear sifde one, left side one in FIGS. 3 and 26, of the rail slots 25a while the remaining guide pin 26a or 26a' is fitted for sliding movement in the other front side rail slot 25a.

Figure 27:
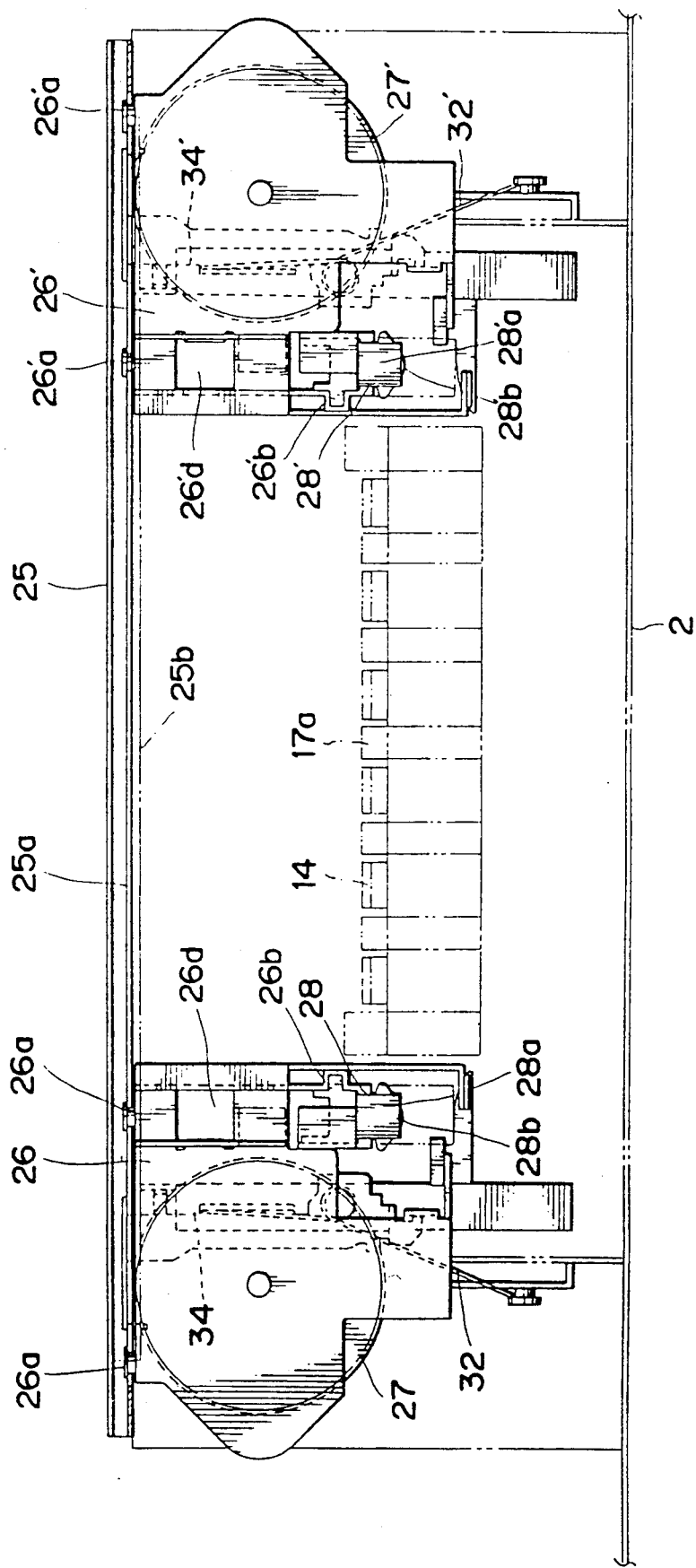
FIGS. 27 and 28 are a rear elevational view and a side elevational view, respectively, showing the carrier operating mechanism in the position shown in FIG. 26.
Figure 28:
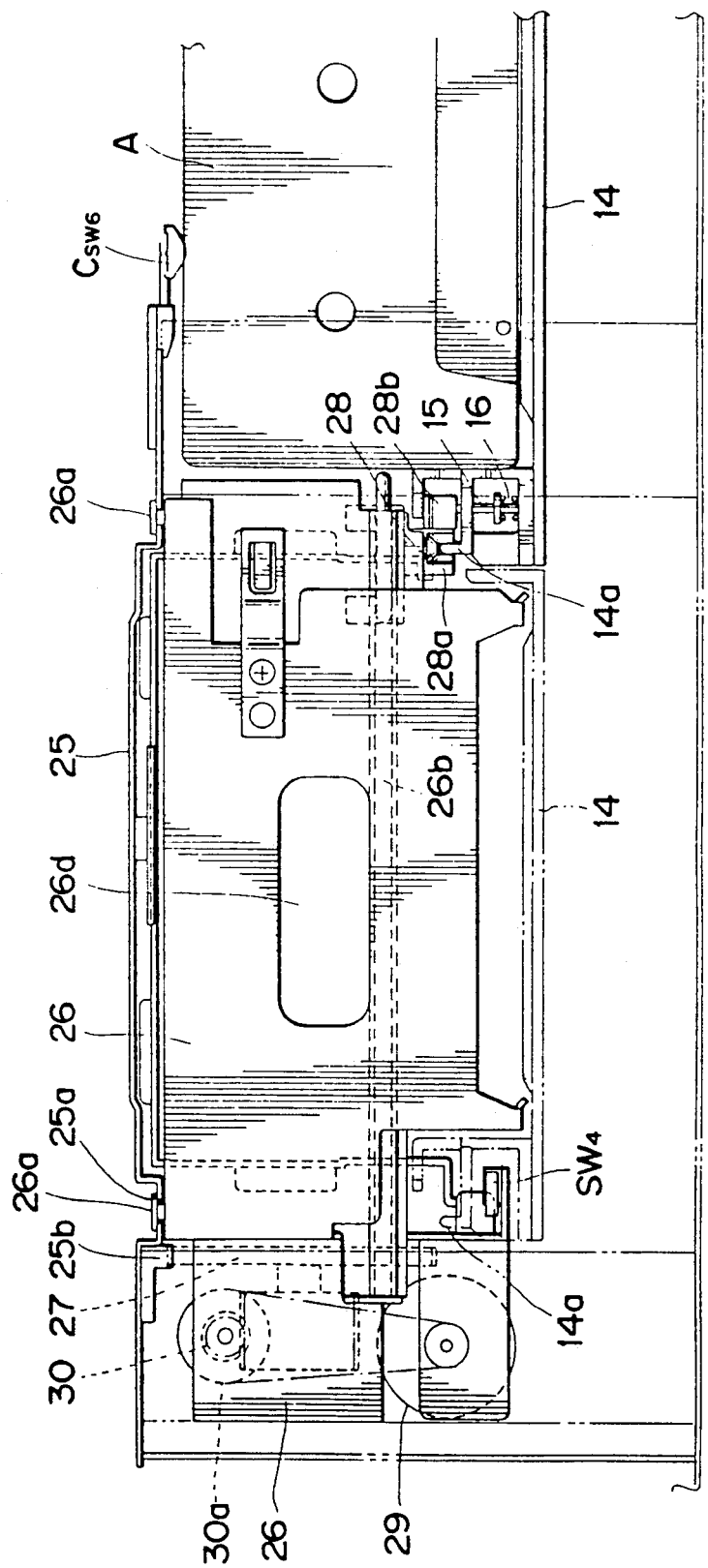

Referring also to FIG. 27, a gear wheel 27 or 27' is supported for rotation on each of the carriers 26 and 26' and normally held in meshing engagement with a rack 25b provided on the rail member 25 along the rear side rail slot 25a so that, when the gear wheel 27 or 27' is rotated, the carrier 26 or 26' may be moved along the rail alots 25a of the rail member 25.

Figure 32:
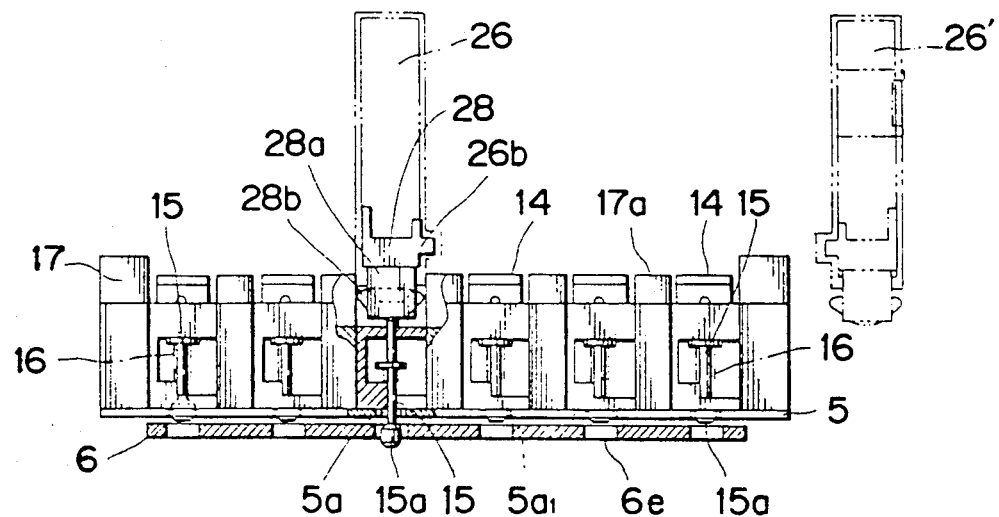
FIG. 32 is a side elevational sectional view showing a relationship between cases and an aligning member.
Figure 33:
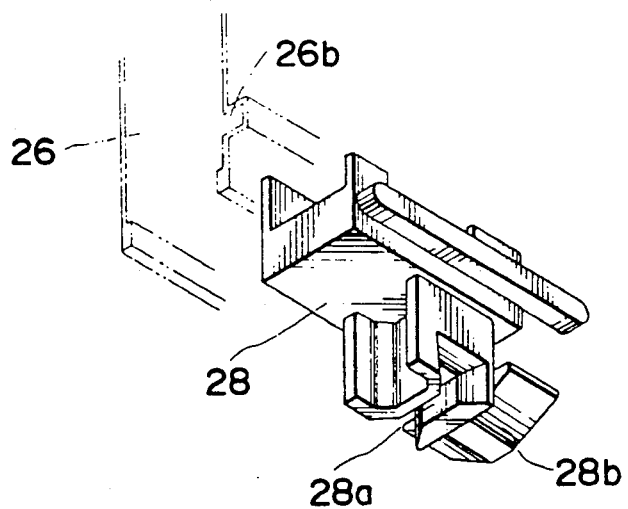
FIG. 33 is a perspective view showing the aligning member and the carrier.
Figure 34:
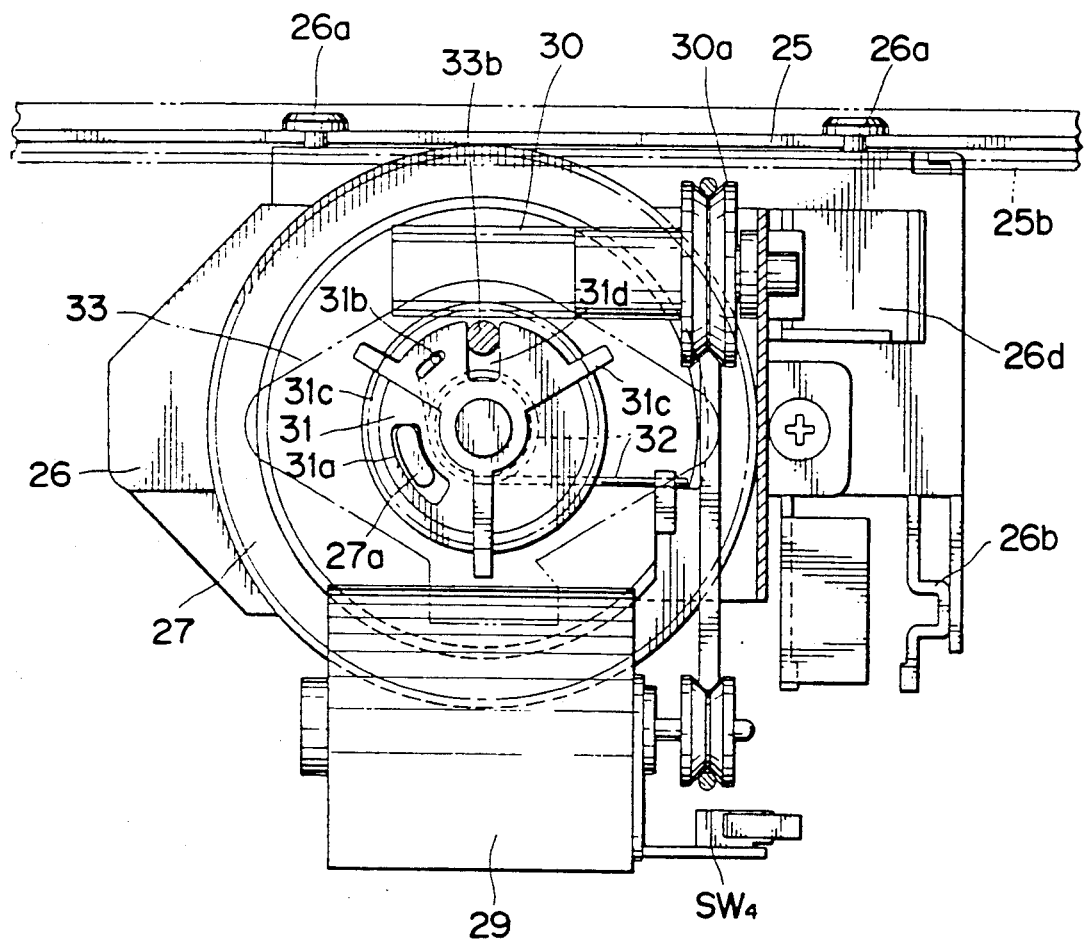
FIG. 34 is an enlarged partial rear elevational view of a carrier driving mechanism.
Figure 35:
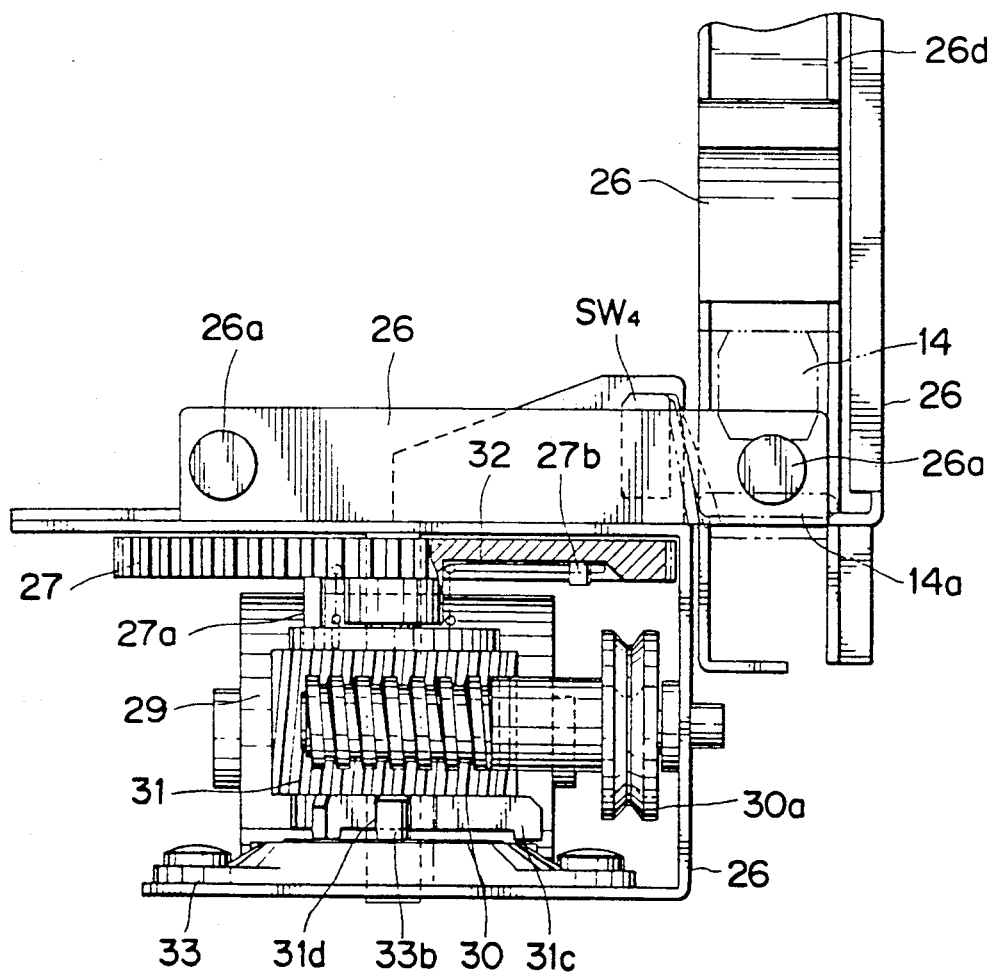
FIG. 35 is a top plan view of the carrier driving mechanism.

A guide member 28 or 28' is mounted on a mounting portion 26b or 26b' of each of the carriers 26 and 26'. Referring to FIGS. 32 and 33, each of the guide members 28 and 28' includes an aligning guide 28a or 28a' for successively engaging, when the carrier 26 or 26' is moved along the rail slots 25a of the rail member 25, with the opposite front and rear faces of the aligning walls 14a and 17b of the cassette receiving members 14 and accommodating member 17 to align the aligning walls 14a and 17b along a straight line, and a depressing guide 28b or 28b' formed in an integral relationship with the aligning guide 28a or 28a' for successively engaging, when the carrier 26 or 26' is moved along the rail slots 25a, with the top ends of the pins 15 of the cassette receiving members 14 to push down the pins 15 against the springs 16.

Figure 29:
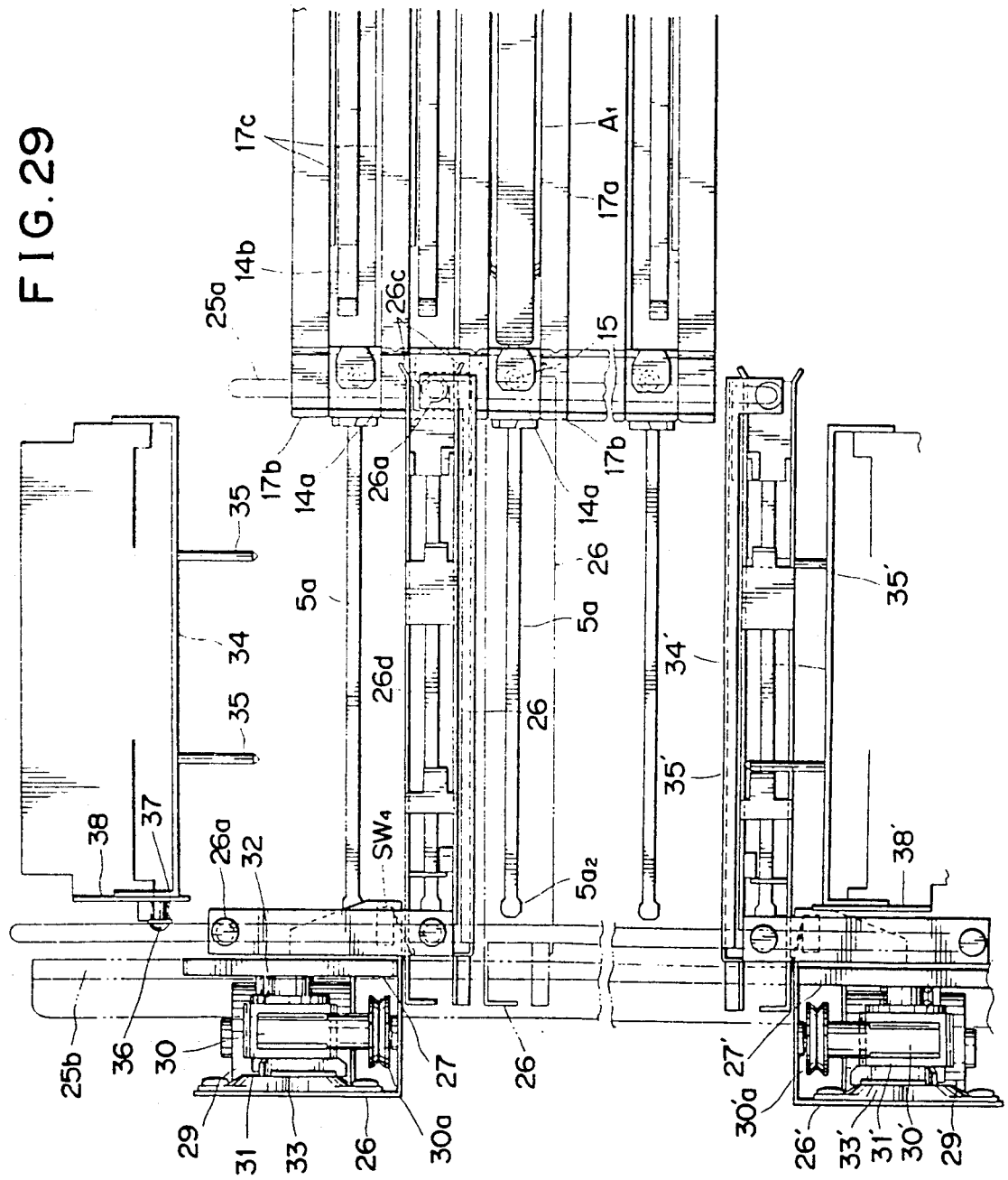
FIG. 29 is a plan view similar to FIG. 26 but showing the carrier operating mechanism when an accommodating chamber of the carrier comes to a position of a case preceding by one case distance to another case which is at the transfer position.
Figure 31:
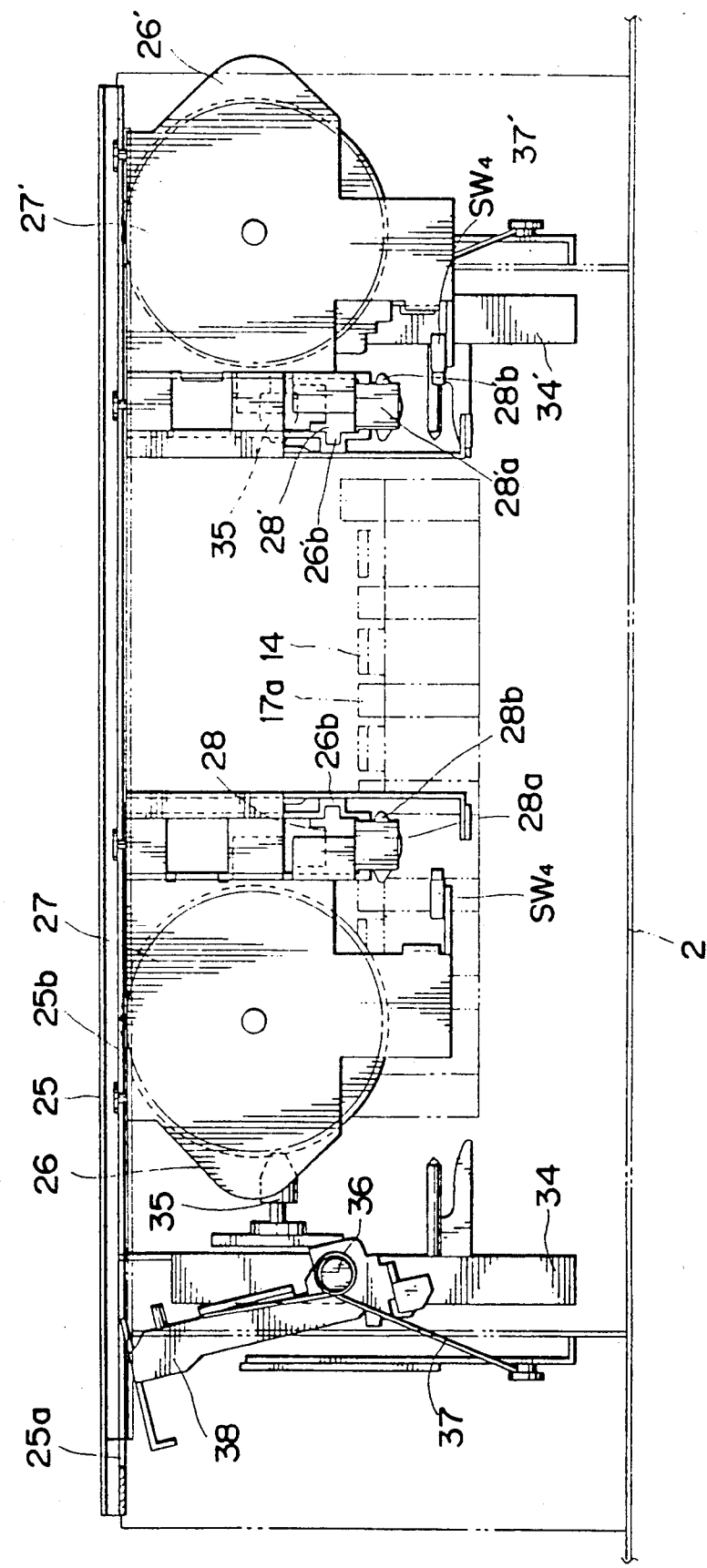
FIG. 31 is a rear elevational view showing the carrier operating mechanism in the position shown in FIG. 30.

Referring back to FIGS. 3, 26 and 27, each of the carriers 26 and 26' has an accommodating chamber 26d or 26d' for a tape cassette A which is defined by a pair of introducing walls 26c or 26c' having outwardly bent ends and is opened toward the accommodating member 7. Each of the carriers 26 and 26' further has a detecting switch $SW_4$ or $SW_4'$ located thereon as shown in FIGS. 29 and 31 such that it is pushed and turned on by a cassette receiving member 4 when the expanded portion 15a of the pin 15 on the cassette receiving member 4 is received in the rear expanded portion $5a_2$ of the associated guide slot 5a.

Referring to FIGS. 28 to 31, a motor 29 or 29' is mounted on each of the carriers 26 and 26' and connected to a pulley 30a or 30a' by way of a mechanism including a pulley and a belt not shown. Each of the pulleys 30a and 30a' is formed in an integrated relationship on a worm 30 or 30' which is normally held in meshing engagement with a worm gear 31 or 31'. Accordingly, if the motor 29 or 29' is energized, then the worm gear 31 or 31' is rotated thereby.

Figure 36:
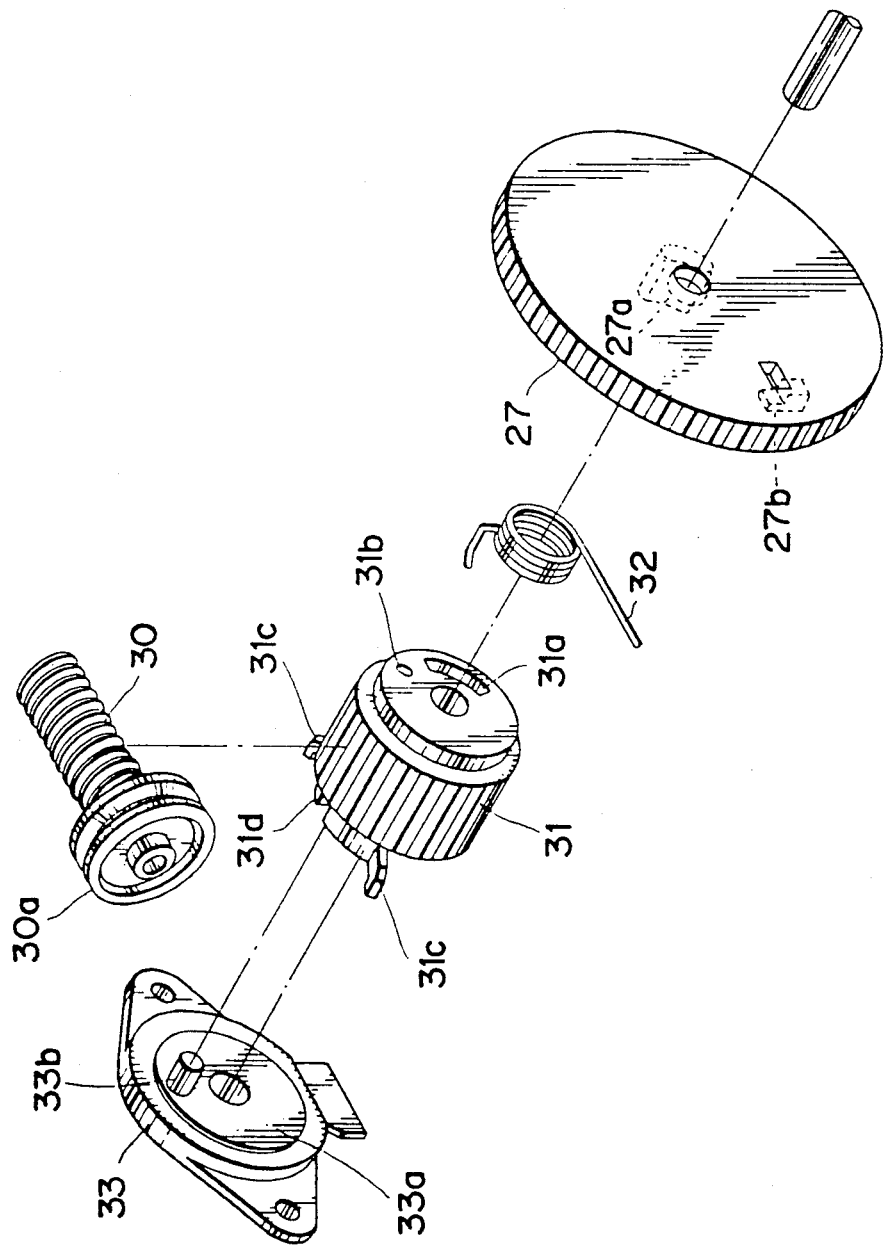
FIG. 36 is a fragmentary perspective view of the carrier driving mechanism.

Referring to FIG. 36, the worm gear 31 and associated elements are shown. Since the other worm gear 31' and associated elements have a similar construction to the worm gear 31 and its associated elements, description will be given below only of the worm gear 31 and its associated elements shown in FIG. 36. The worm gear 31 is mounted in a coaxial relationship with but for independent rotation from the gear wheel 27 and has an arcuate engaging hole 31a perforated axially therethrough. A projection 27a is formed on an end face of the gear wheel 27 and received in the engaging hole 31a of the worm gear 31 in such a manner as to restrict relative rotation of the gear wheel 27 and the worm gear 31 to a predetermined angular range. A torsion spring 32 extends between a hole 31b formed on an end wall of the worm gear 31 and an engaging tab 27b formed on the end face of the gear wheel 27 and normally biases the gear wheel 27 in the counterclockwise direction in FIG. 36 relative to the worm gear 31 until the projection 27a is engaged with a counterclockwise end of the arcuate engaging hole 31a.

The worm gear 31 has a pair of pressing tabs 31c formed on the other end face thereof with an engaging recess 31d left therebetween. An encoder 33 is mounted on the carrier 26 in an opposing relationship to the worm gear 31, and a projection 33d formed on a face of a rotary element 33a of the encoder 33 is normally held in engagement with the engaging recess 31d of the worm gear 31 so that the rotary element 33a may be rotated by rotation of the worm gear 31.

Rotation of the worm gear 31 is transmitted to rotate the gear wheel 27 through engagement of the projection 27a on the gear wheel 27 with either end of the arcuate engagement hole 31a of the worm gear 31. Upon such rotation of the gear wheel 27, the carrier 26 is moved in the leftward or rightward direction in FIG. 27 along the rail slots 25a of the rail member 25 due to meshing engagement of the gear wheel 27 with the rack 25b.

During such movement of the carrier 26, each time the accommodating chamber 26d thereof comes to a position of any cassette receiving member 14, the encoder 33 develops a signal by way of the rotary element 33a which is rotated by the worm gear 31.

Referring to FIG. 3, a plurality of, 6 in the embodiment shown, switches $C_{SW1}$ to $C_{SW6}$ are provided each of which is located such that it is pushed, when the tray base plate 5 is positioned at its home position on the inner side of the loading window 1a as shown in FIG. 15, by a tape cassette A placed on a corresponding cassette receiving member 14 to present an on-state to detect an accommodated condition of the tape cassette A.

Referring to FIGS. 5, 29 and 31, the tape player further includes a pair of tape driving mechanisms disposed in a symmetrical relationship on the chassis 2. Each of the tape driving mechanism includes a feeding chassis 34 or 34' having a pair of reel driving members 35 or 35' mounted thereon for being inserted into reel holes $A_2$ of at tape cassette A to rotate reels not shown in the tape cassette A. Though not shown, a magnetic head, a pair of capstans and some other elements which are normally provided on a common tape player are also mounted on each of the feeding chassis 34 and 34'. Such elements may include a safety lug which normally is snapped away after recording of the tape cassette A or include a detecting element for detecting a type of a tape of the tape cassette A set on the feeding chassis 34 or 34'.

Each of the feeding chassis 34 and 34' has a lever 38 or 38' mounted for pivotal motion thereon by means of a shaft 36 (only the shft 36 for the lever 38 is shown). Each of the levers 38 and 38' is normally biased in the clockwise or counterclockwise direction in FIG. 31 by a torsion spring 37 or 37' interposed between the lever 38 or 38' and the feeding chassis 34 or 34'. Thus, when the carrier 26 or 26' is moved to the feeding chassis 34 or 34', the lever 38 or 38' is pivoted in the counterclockwise or clockwise direction against the biasing force of the torsion spring 37 or 37' by the carrier 26 or 26' to put the detecting element into a detecting condition.

Operation of the tape player in which the cassette changer according to the present invention is incorporated will be described in the following.

The tray base plate 5 normally assumes such a home position as desribed hereinabove. When the tray base plate 5 is in the home position as shown in FIG. 15, the tray driving plate 6 assumes a forward end position, i.e., rightward end position in FIGS. 8 and 9, with respect to the tray base 5. Meanwhile, the carriers 26 and 26' remain in contact with the feeding chassis 34 and 34', respectively, as shown in FIG. 4.

In this condition, if a loading button LB provided on the front panel 1 shown in FIG. 1 is depressed, then the motor 7 is energized to rotate the gear wheel 8 in the clockwise direction in FIG. 12 to move the rack 10 in the rightward direction in FIGS. 6 and 12. Upon such movement of the rack 10, the tray driving plate 6 is moved, due to meshing engagement of the gear wheel 11 on the rack 6b of the driving plate 6, by a distance equal to twice the distance over which the rack 10 is moved. Upon such movement of the tray driving plate 6, the forward end portion 6b therefore abuts with the bent portion 5d of the tray base plate 5 to move the tray base plate 5 in the forward direction, i.e., rightward direction in FIG. 12, from the position shown in FIG. 15 together therewith.

At an initial stage of the movement of the driving plate 5, the ball 13 is received into the recess 6c of the tray driving plate 6 while being moved out of the recess 4b onto the flat face 4c of the guide member 4 to establish an interlocking relationship between the tray driving plate 6 and the tray base plate 5.

Then, when the accommodating member 17 on the tray base plate 5 is projected to its outer limit position or cassette exchanging position forwardly of the loading window 1a of the front panel 1 as shown in FIGS. 7 and 9, the detecting switch $SW_1$ is pushed and turned on by the projection 5e on the tray base plate 5 as seen in FIG. 7. Consequently, the motor 7 is stopped.

When the accommodating member 17 is in the cassette exchanging position in this manner, tape cassettes A can be removed from or placed into arbitrary ones of the spacings between the partition walls 17a of the accommodating member 17. Meanwhile, the door 21 assumes such a depending position as seen in FIG. 7 in which it closes the loading window 1a of the front panel 1 above the accommodating member 17. Accordingly, the inside of the tape player cannot be observed by way of the loading window 1a, and no foreign article may be inserted into the inside of the tape player by way of the loading window 1a.

After tape cassettes A have been placed into all or selected ones of the cassette receiving members 14 in the spacings between the partition walls 17a of the accommodating member 17, the loading button LB will be depressed again.

Consequently, the motor 7 is energized to rotate but in the reverse direction now so that the tray driving plate 6 is driven to move backwardly, leftwardly in FIG. 12, by way of the gear wheel 8, rack 10 and gear wheel 11. In this instance, since the ball 13 rides on the flat face 4c of the guide member 4 and remains received in the recess 6c of the tray driving plate 6, the tray driving plate 6 and tray base plate 5 remain in and interlocking condition, and accordingly, also the tray base plate 5 is moved backwardly, that is, leftwardly in FIG. 12, by and together with the tray driving plate 6.

Upon such movement of the tray base plate 5, the projection 5f thereon is placed away from the lever 24, and consequently, the door 21 is pivoted in the clockwise direction in FIG. 7 from the depending position shown in FIG. 7 to its horizontal position shown in FIG. 12. When the door 21 is in the horizontal position, the guide projections 21c thereon do not permit passage of a tape cassette A which is placed in a wrong orientation with the tape exposing wall thereof directed upwardly along which the tape in the tape cassette A is exposed outside. Accordingly, only those tape cassettes A which have been placed in a right orientation are admitted into the inside of the tape player, which prevents an inadvertent trouble which may be caused by a tape cassette A which has been introduced in a wrong orientation into the inside of the tape player.

During the backward movement of the tray driving plate 6, the projection $6f_1$ on the tray driving plate 6 is soon engaged with the detecting switch $SW_2$, and then after the operating element 20 is disengaged from the projection $6f_1$ and returns to its normal vertical position as shown in FIG. 17 to turn the switch $SW_2$ off, the motor 7 is reversed but now rotates at a reduced speed. Accordingly, the tray driving plate 6 is moved back in the forward direction 18 as indicated by a broken line allow mark a in FIG. 18.

Then, when the projection $6f_1$ turns the detecting switch $SW_2$ on again, the motor 7 is stopped so that the dray driving plate 6 may be stopped at the position.

Thereupon, the ball 13 is received into the recess 4b of the guide member 4 and thus moved out of the recess 6c of the tray driving plate 6. Consequently, the interlocking relationship between the tray driving plate 6 and tray base plate 5 is cancelled. Meanwhile, the engaging holes 6e of the tray driving plate 6 are positioned just below the pins 15 as seen in FIG. 14a. The initial state described above is thus restored.

When the accommodating member 17 is returned to its home position by the returning movement of the tray base plate 5, those of the switches $C_{SW_1}$ to $C_{SW_6}$ which correspond to the tape cassettes A accommodated in the accommodating member 17 are pushed and turned on by the tape cassettes A. Consequently, a display section 1c of the front panel 1 shown in FIG. 1 provides a visual indication of the tape cassettes A accommodated in the cassette receiving members 14, that is, in the accommodating member 17.

When the tray base plate 5 and tray driving plate 6 are individually in the home positions and the cassette receiving members 14 on which the tape cassettes A are placed are indicated on the display section 1c, an arbitrary one of selection buttons $SB_1$ to $SB_3$ and $SB_1'$ to $SB_3'$ provided on the front panel 1 may be depressed to select one of those cassette receiving members 14 on which the tape cassettes A are placed, that is, to select one of the tape cassettes A. Thus, for example, the selection button SB₃ is selectively depressed.

In response to depression of the selection button SB₃, the motor 29 is engergized to start its rotation. Rotation of the motor 29 is transmitted to the worm gear 31 to rotate the gear wheel 27 due to fitting engagement of the projection 27a of the gear wheel 27 in the engaging hole 31 of the worm gear 31. Since the gear wheel 27 is held in meshing engagement with the rack 25b of the rail member 25, the carrier 26 on which the gear wheel 27 is supported for rotation is moved in the leftward direction, that is, in the downward direction in FIG. 26, along the rail slots 25a of the rail member 25.

Then, when the carrier 26 comes to a position at which the accommodating chamber 26d thereof coincides with the second cassette receiving member 14 preceding by one cassette receiving member pitch to the third cassette receiving member 14 has been selected by the selection button SB₃ as shown in FIG. 29, the position is detected by the encoder 33 from an angle of rotation over which the rotary member 33a of the encoder 33 connected to the worm gear 31 has been rotated.

Figure 30:
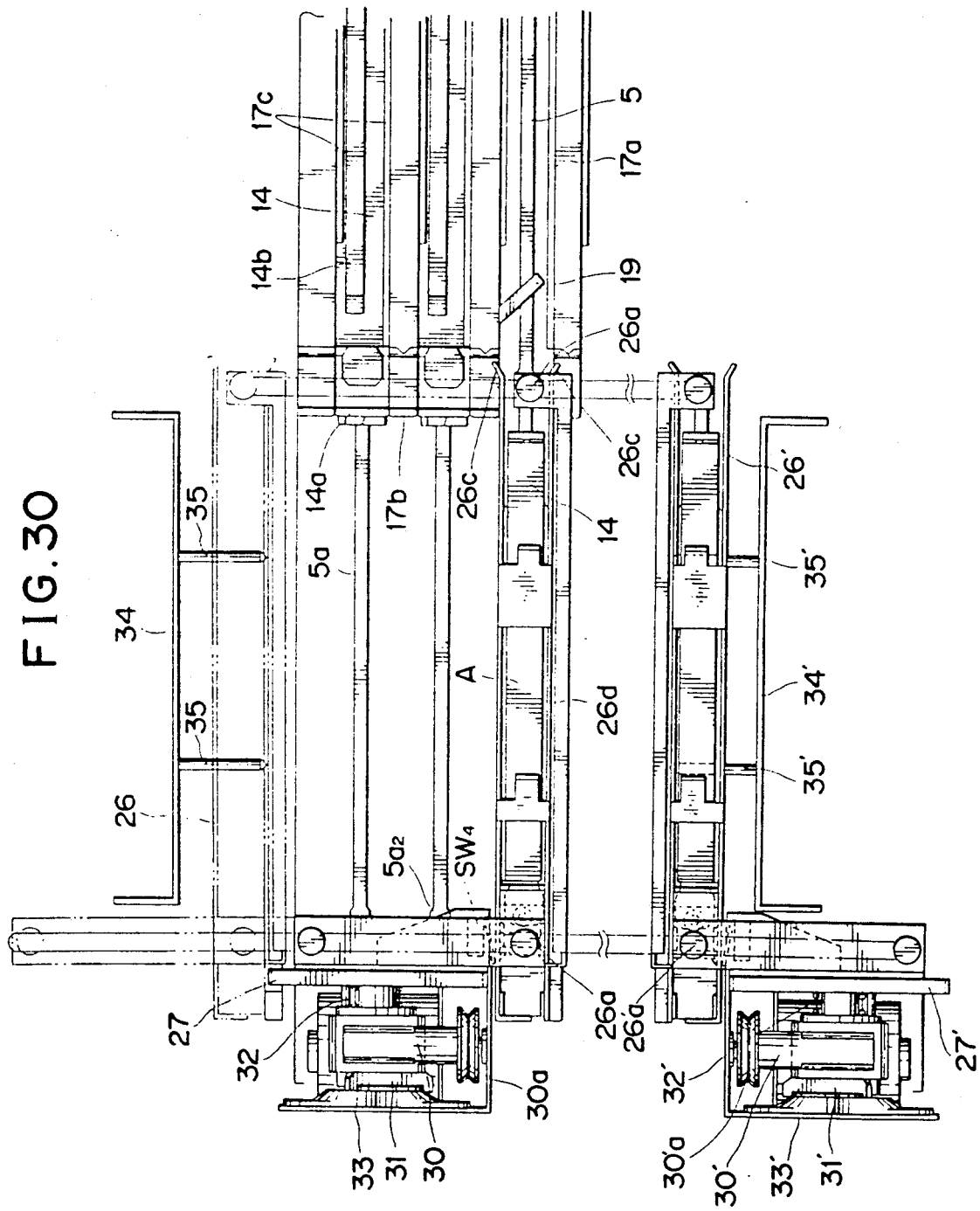
FIG. 30 is a plan view similar to FIG. 26 but showing the carrier operating mechanism when a tape cassette is transferred.

In response to such detection, the speed of rotation of the motor 29 is reduced. Consequently, the carrier 26 is moved at a reduced speed to a position at which the accommodating chamber 26d therefore coincides with the selected third cassette receiving member 14 as shown in FIG. 30. The position is detected similarly by the encoder 33, and the motor 29 is stopped now. During such movement of the carrier 26, the aligning guide 28a of the aligning member 28 mounted thereon is successively engaged with the front and rear opposite faces of the aligning walls 17b of the accommodating member 17 and the aligning walls 14a of the cassette receiving members 14 to arrange the aligning walls 17b and 14a on a predetermined straight line. Consequently, the expanded portions 15a of the pins 15 mounted on the cassette receiving members 14 are registered accurately with the engaging holes 6 of the tray driving plate 6. In this condition, the pins 15 are successively pushed down by the depressing guide 28b of the aligning member 28 on the carrier 26. Consequently, the expanded portions 15a of the pins 15 are successively moved out of the expanded portions 5a₁ of the guide slots 5a of the tray base plate 5 into the engaging holes 6e of the tray driving plate 6. After the aligning member 28 passes, each of the pins 15 is moved back upwardly by the corresponding spring 16 to move the expanded portion 15a thereof out of the engaging hole 6e back into the expanded portion 5a₁ of the guide slot 5a. However, since the carrier 16 stops at the position at which the accommodating chamber 26d thereof coincides with the third cassette receiving member 14 and hence the aligning member 28 on the carrier 16 coincides with the pin 15 of the third cassette receiving member 14, the expanding portion 15a of the pin 15 remains received in the corresponding engaging hole 6e of the tray driving plate 6. Consequently, the third cassette receiving member 14 can thereafter move along the guide slot 5a together with the tray driving plate 6.

After stopping of the motor 29, the motor 7 is energized again so that the tray driving plate 6 is moved backwardly, i.e., leftwardly in FIG. 12, from the position shown in FIG. 12. Since the ball 13 is received in the recess 4b of the guide member 4 then and the interlocking relationship between the tray base-plate 5 and tray driving plate 6 has been already cancelled, the third cassette receiving member 14 is moved leftwardly in FIG. 12 by and together with the tray driving plate 6.

Then, when the tray driving plate 6 comes to such a position as shown in FIGS. 20 and 21, the projection 6f₁ thereon depresses the detecting switch SW₃ shown in FIG. 23 so that the detecting switch SW₃ detects the position of the tray driving plate 6. The motor 7 is stopped in response to such detection.

When the third cassette receiving member 14 is moved by such movement of the tray driving plate 6, the aligning guide 28a of the aligning member 28 is moved on the carrier 26 while keeping the pin 15 depressed because it engages with the opposite front and rear faces of the aligning wall 14 of the cassette receiving member 14.

When the cassette receiving member 14 is moved to its transfer position shown FIGS. 20 and 21, the tape cassette A on the cassette receiving member 14 is introduced into the accommodating chamber 26d of the carrier 26 waiting there, thereby completing transfer of the tape cassette A from the cassette receiving member 14 to the carrier 26.

Upon completion of such transfer, the detecting swirch SW₄ is pushed and turned on by the cassette receiving member 14 so that the motor 29 starts its rotation but in the reverse direction. Consequently, the carrier 26 starts its movement reversely toward the feeding chassis 34. Upon such movement of the carrier 26, the aligning member 28 is moved together to cancel such depression of the pin 15 of the third cassette receiving member 14 by the depressing guide 28b as described above. As a result, the pin 15 is moved upwardly by the biasing force of the spring 16 to move the expanded portion 15a thereof into the expanded portion 5a₂ of the guide slot 5a of the tray base plate 5. As a result, the cassette receiving member 14 is fixed to the position with respect to the tray base plate 5.

Meanwhile, the carrier 26 continues its movement toward the feeding chassis 34 until it is abutted at a wall of the accommodating chamber 26d thereof with the feeding chassis 34. At a final stage of such movement of the carrier 26, the reel driving members 35 of the feeding chassis 34 are fitted into the reel holes A2 of the tape cassette A while the carrier 26 pushes the lever 38 to pivot around the shaft 36 on the feeding chassis 34 to enable discrimination of a type of the tape cassette A and presence or absence of a safety lug on the tape cassette A.

In this condition, however, the motor 29 is not deenergized yet and still continues its rotation to further move the carrier 26. Since the carrier 26 is mechanically stopped from movement by the feeding chassis 34, however, the gear wheel 27 is stopped from rotation. As a result, continued rotation of the motor 29 causes rotation of the worm gear 31 relative to the gear wheel 27 in a fixed condition while increasing the biasing force of the torsion spring 32. During such rotation of the worm gear 31, the projection 27a on the gear wheel 27 moves in the engaging hole 31a relative to the worm gear 31. Then, when the worm gear 31 is rotated over a predetermined angle relative to the gear wheel 27, the angular position of the worm gear 31 is detected by the encoder 33 thereby to stop rotation of the motor 29.

Such biasing force of the torsion spring 32 will urge the gear wheel 27 to rotate in direction to press the carrier 26 against the feeding chassis 34. Accordingly, the carrier 26 is prevented from moving away from the feeding chassis 34.

Setting of the tape cassette A accommodated in the accommodating chamber 26 of the carrier 26 onto the tape driving mechanism is completed in this manner to enable subsequent reproduction, recording, fast feeding or rewinding of a tape of the tape cassette A.

Then, if one of the selection buttons SB1' to SB3', for example, the selection buttom SB3', is selectively depressed, then the carrier 26' operates in a similar manner to set the tape cassette A on the third cassette receiving member 14 from the left, that is, from below in FIG. 2, in position onto the feeding chassis 34' of the tape feeding mechanism.

In this condition, if, for example, a reproduction button is selectively operated, then reproduction of the tape of the tape cassette A on the right-hand side feeding chassis 34 of the tape driving mechanism is carried out at first for the opposite tape feeding directions. Then, after completion of such reproduction, reproduction of the tape of the tape cassette A on the feeding chassis 34' of the other left-hand side tape driving mechanism is carried out for the opposite tape feeding directions. The tape cassettes A, however, may be reproduced or recorded arbitrarily in a difference sequence. For example, the tape cassettes A on the right-hand side and the left-hand side may be reproduced successively for one direction whereafter they are reproduced successively for the reverse direction.

If a reture button RB for instruction of returning of a tape cassette A is depressed with the tape cassettes A set in such a condition as described above, then the motor 29 starts its rotation to move the carrier 26 away from the feeding chassis 34. Then, when the carrier 26 comes to the position at which the accommodating chamber 26d thereof coincides with the cassette receiving member 14 preceding by one cassette receiving member pitch to the cassette receiving member 14 the pin 15 of which is received at the expanded portion 15a thereof in the expanded portion 5a₂ of the corresponding guide slot 5a of the tray base plate 5, this is detected by the encoder 33, and the speed of rotation of the motor 29 is reduced. Then, when the carrier 26 comes to the position at which the accommodating chamber 26d thereof coincides now with the cassette receiving member 14 the pin 15 of which is received at the expanded portion 15a thereof in the expanded portion 5a₂ of the corresponding guide slot 5a, the aligning wall 14a of the cassette receiving member 14 is introduced into the aligning guide 28a of the aligning member 28 while the depressing guide 28b of the aligning member 28 pushes down the pin 15. Consequently, the expanded portion 15a of the pin 15 is moved out of the expanded portion 5a₂ of the guide slot 5a of the tray base plate 5 into the engaging hole 6e of the tray driving plate 6.

Figure 24:
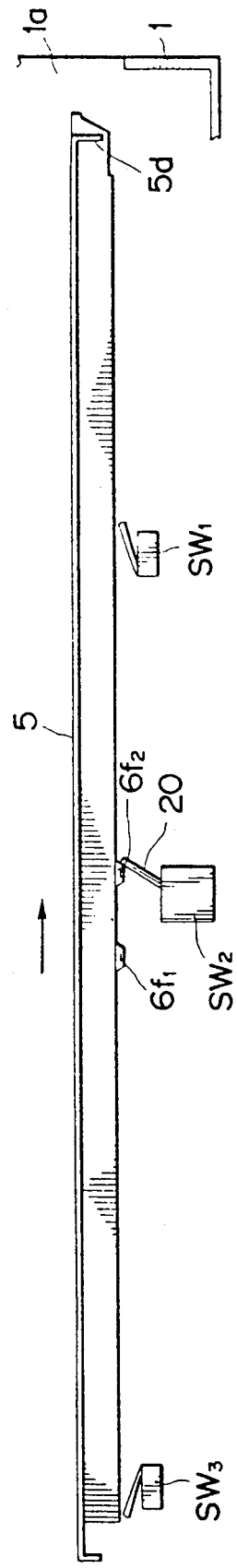
Figure 25:
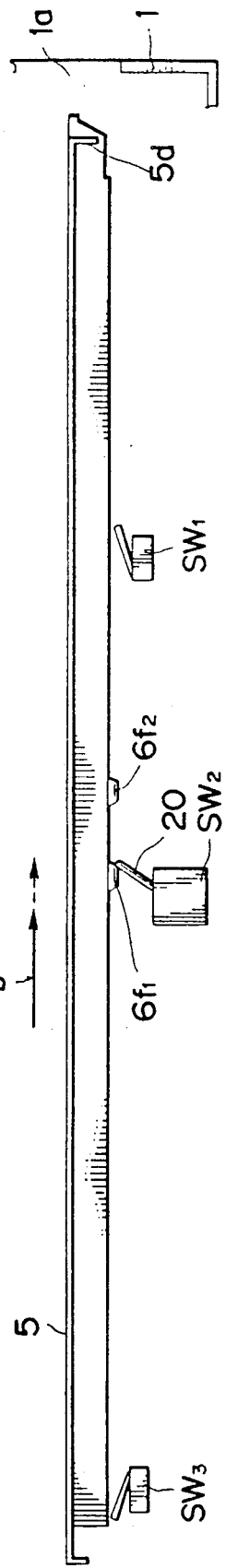

Simultaneously, the detecting switch SW₄ on the carrier 26 is pushed and turned on by the cassette receiving member 14 while the encoder 33 detects the position of the cassette receiving member 14. Consequently, the motor 29 is stopped, and after then, the motor 7 starts its rotation. Upon such rotation of the motor 7, the tray driving plate 6 is moved together with the cassette receiving member 14 from the position shown in FIGS. 20 and 21 toward the position shown in FIGS. 13 and 14 while the aligning member 28 is moved together with the cassette receiving member 14 from a solid line position to a phantom position in FIG. 21 on the carrier 26. During such returning movement of the tray driving plate 6, when the projection 6f₂ thereon turns the detecting switch SW₂ on as seen in FIG. 24, rotation of the motor 7 is retarded so that the tray driving plate 7 is thereafter moved at a reduced speed as indicated by a broken line arrow mark b in FIG. 25. Then, when the projection 6f₂ on the tray driving plate 6 turns the detecting switch SW₂ on again, the motor 7 is stopped.

After the tray driving member 6 is returned to the home position in this manner, the motor 29 is rotated again in the reverse direction to return the carrier 26 to the position in which the carrier 26 is pressed against the feeding chassis 34 similarly as in setting of the tape cassette A.

Similar operation will be performed with the left-hand side carrier 26'.

The reason why the tray driving plate 6 is moved reversely by a little distance and then decelerated during movement to its transfer position and also why the carrier 26 is decelerated at a position preceding to the cassette receiving member 14 from the cassette A is to be transferred is that it is intended to assure prevention of inaccuracy of the stopping positions of those elements due to impact and inertia of them and also to assure stopping of those elements at correct positions by prevention of backlashes of the associated driving mechanisms.

If the loading button LB is depressed while reproduction of a tape cassette A is being performed, then the motor 7 is energized so that the tray base plate 5 and tray driving plate 6 are advanced to the outwardly projected cassette receiving position by way of the loading window 1a of the front panel 1 as shown in FIGS. 6 to 10 while the third cassette receiving member 14 remains at the transfer position as described above. Consequently, the other tape cassettes A in the accommodating member 17 can be selectively exchanged. Accordingly, with the cassette changer of the embodiment described above, tape cassettes which are not being played can be exchanged during playing of a tape cassette.

In such an instance, from the partition wall 17a of the accommodating member 17 on one side of the cassette receiving member 14 at the transfer position, the corresponding projecting wall 19 is projected by the biasing force of the torsion spring 18 to the location from which the cassette receiving member 14 has been moved. The projecting wall 19 thus prevents another tape cassette A from being placed to the location. Accordingly, insertion in error of another tape cassette A into the orignal location of the tape cassette A being played can be prevented effectively.

Further, it often happens that, for example, when the power source of the tape player is disconnected during playing of a tape cassette A, it becomes vague to whichever cassette receiving member 14 the tape cassette A belongs. In such an instance, the unknown cassette receiving member 14 can be discriminated in the following manner. In particular, after the power source becomes available again, the carrier 26 is caused to move away from the feeding chassis 34 until the detecting switch SW₄ is turned on by the cassette receiving member 14 for the tape cassette A. The tape cassette A can be discriminated from an output of the encoder 33 then.

While the tape player described above includes a pair of left- and right-hand side tape driving mechanisms each including various elements provided on the feeding chassis 34 or 34', it may otherwise include only one tape driving mechanism including various elements provided. for example, on the feeding chassis 34. With the alternative arrangement. substantially similar functions can be attained except such continuous playing of two tape cassettes A as described hereinabove, and the mechanical construction is simplified, which allows the tape player to be produced at a reduced cost.

Having now fully described the invention, it will be apparent to one of ordinary skill in the art that many changes and modifications can be made thereto without departing from the spirit and scope of the invention as set forth herein.

What is claimed is:

1. A cassette changer for a tape player, comprising a plurality of cassette receiving members each for removably receiving a tape cassette thereon, an accommodating member for receiving said cassette receiving members in a row thereon, a selectively actuating means for selectively moving one of said cassette receiving members from a home position on said accommodating member to a transfer position outside said accommodating member, a tape conveying mechanism mounted in a fixed relationship with respect to said accommodating member for receiving a tape cassette thereon and conveying a tape of the tape cassette, and a carrier for receiving therein a tape cassette from a selected one of said cassette receiving members moved to the transfer position and setting the tape cassette in position onto said tape conveying mechanism.

2. A cassette changer as claimed in claim 1, further comprising means for arresting the selected cassette receiving member at the transfer position until the tape cassette is returned from said carrier to the selected cassette receiving member in the transfer position.

3. A cassette changer as claimed in claim 1, further comprising a detecting means provided on said carrier for operation by the selected one of said cassette receiving members moved from the home position to the transfer position, and a detecting switch provided on said carrier for detecting a position of said carrier.

4. A cassette changer as claimed in claim 1, further comprising a detecting means on said selectively actuating means for detecting that each of said cassette receiving members is at the home position and that each of said cassette receiving members arrives, during movement thereof toward the home position, at an intermediate position spaced by a predetermined distance from the home position.

5. A cassette changer as claimed in claim 4, wherein said selectively actuating means moves, when the selected one of said cassette receiving members is to be returned from the transfer position to the home position, the selected cassette receiving member at a first speed to the intermediate position and then at a second speed lower than the first speed to the home position.

6. A cassette changer as claimed in claim 1, wherein said accommodating member has a plurality of partition walls each adjacent ones of which define therebetween a cassette receiving spacing for receiving one of said cassette receiving members for movement therein, and further comprising an aligning wall provided on each of said cassette receiving members and said partition walls, and an aligning member mounted on said carrier for engaging, upon movement of said carrier, with the aligning walls to put the aligning walls in an aligned condition on a straight line.

7. A cassette changer according to claim 1, further comprising an arresting means for arresting each of said cassette receiving members at each of the home position and the transfer position with respect to said accommodating member, and a cancelling means for selectively cancelling the arrested condition of one of said cassette receiving members at the home position or at the transfer position with respect to said accommodating member to permit said selectively actuating means to move the one cassette receiving member from the transfer position to the home position or from the home position to the transfer position.

8. A cassette changer as claimed in claim 7, wherein said accommodating member has a plurality of partition walls each adjacent ones of which define therebetween a cassette receiving spacing for receiving one of said cassette receiving members for movement therein, and each of said cassette receiving members and said partition walls has an aligning wall formed thereon while said cancelling means is mounted on said carrier and also acts to engage, upon movement of said carrier, with the aligning walls to put the aligning walls in an aligned condition on a straight line.

9. A cassette changer as claimed in claim 1, further comprising an additional tape conveying mechanism mounted in a fixed relationship with respect to said accommodating member, the two tape conveying mechanisms being disposed in a substantially symmetrical relationship on the opposite sides of said accommodating member in the second position, and an additional carrier for receiving a tape cassette from a second selected one of said cassette receiving members moved to the transfer position and setting the tape cassette in position onto said additional tape driving mechanism.

10. A cassette changer as claimed in claim 1, wherein said accommodating member is mounted for movement between a first position in which said accommodating member is exposed outside a housing of said tape player to allow tape cassettes to be received into or removed from said cassette receiving members and a second position in which said accommodating member is accommodated in said housing, said housing having an opening formed therein for passing said accommodating member therethrough, said tape conveying mechanism being mounted in a fixed relationship with respect to said accommodating member in the second position.

11. A cassette changer as claimed in claim 10, wherein said selectively actuating means acts to selectively move one of said cassette receiving members perpendicularly to the row of said cassette receiving members from the home position to the transport position, and said carrier is mounted for movement in parallel to the row of said cassette receiving members from and to said tape conveying mechanism along a side of said accommodating member in the second position remote from said opening of said housing.

12. A cassette changer as claimed in claim 10, wherein said accommodating member has a plurality of cassette receiving sections for removably receiving in a row therein a plurality of tape cassettes each of which has a thinner portion and a thicker portion adjacent a tape exposing wall along which a tape is exposed outside the tape cassette, each of said cassette receiving sections being defined by a pair of receiving portions spaced by a greater distance than the thickness of the thinner portion of a tape cassette for supporting the opposite sides of the thinner portion of a tape cassette thereon and a pair of partition walls spaced by a distance substantially equal to the thickness of the thicker portion of a tape cassette for supporting the opposite sides of the thicker portion of a tape cassette thereon, each of said cassette receiving members being received for movement in one of said cassette receiving sections.

13. A cassette changer as claimed in claim 10, wherein said accommodating member is formed so as to receive thicker portions of a plurality of tape cassettes in row thereon, and further comprising a passage permitting means provided intermediately of a path of said accommodating member from the first to the second position for permitting only thinner portions of tape cassettes to pass therethrough.

14. A cassette changer as claimed in claim 13, further comprising a door operatively connected to said accommodating member such that said door opens said opening when said accommodating member moves from the first to the second position, but said door closes said opening when said accommodating member moves from the second to the first position, said passage permitting means being provided on said door.

15. A cassette changer as claimed in claim 10, further comprising a plurality of cassette insertion preventing members each mounted on said accommodating member for movement such that the cassette insertion preventing member is normally accommodated in said accommodating member by a corresponding one of said cassette receiving members, but when the corresponding cassette receiving member is in the second position, the cassette insertion preventing member projects into a spacing from which the corresponding cassette receiving member has moved to prevent another tape cassette from being inserted into the spacing.

16. A cassette changer for a tape player, comprising a plurality of cassette receiving members each for removably receiving a tape cassette thereon and for carrying the tape cassette from a home position to a transfer position, means for selectively moving one of said cassette receiving members from the home position to the transfer position, a tape conveying mechanism for receiving a tape cassette thereon and conveying a tape of the tape cassette, a carrier for receiving therein a tape cassette from a selected one of said cassette receiving members moved to the transfer position and setting the tape cassette in position onto said tape conveying mechanism, and means for arresting the selected cassette receiving member at the transfer position until the tape cassette is returned from said carrier to the selected cassette receiving member in the transfer position.

17. A cassette changer for a tape player, comprising a plurality of cassette receiving members each for removably receiving a tape cassette thereon and for carrying the tape cassette from a home position to a transfer position, means for selectively moving one of said cassette receiving members from the home position to the transfer position, a tape conveying mechanism for receiving a tape cassette thereon and driving a tape of the tape cassette, a carrier for receiving therein a tape cassette from a selected one of said cassette receiving members moved to the transfer position and setting the tape cassette in position onto said tape conveying mechanism, a detecting means provided on said carrier for operation by the selected one of said cassette receiving members moved from the home position to the transfer position, and a detecting switch provided on said carrier for detecting a position of said carrier.

18. A cassette changer for a tape player, comprising a plurality of cassette receiving members each for removably receiving a tape cassette thereon, an actuating means for selectively moving one of said cassette receiving members from a home position to a transfer position, and means on said actuating means for detecting that each of said cassette receiving members is at the home position and that each of said cassette receiving members arrives, during movement thereof toward the home position, at a position spaced by a predetermined distance from the home position.

19. A cassette changer for a tape player, comprising an accommodating member having a plurality of partition walls each adjacent ones of which define therebetween a tape cassette receiving spacing for removably receiving a tape cassette therein, a cassette receiving member provided for each of the tape cassette receiving spacings for carrying a tape cassette from the position in the tape cassette receiving spacing to a transfer position, an aligning wall provided on each of the cassette receiving members and said partition walls, a carrier mounted for movement along a side of said accommodating member for receiving a tape cassette from one of the cassette receiving members moved to the transfer position, and an aligning member mounted on said carrier for aligning, upon movement of said carrier, the aligning walls on a straight line.

20. A cassette changer for a tape player, comprising a plurality of cassette receiving members each for removably receiving a tape cassette thereon and for carrying the received tape cassette from a home position to a transfer position, a guide means for guiding each of said cassette receiving members for movement from the home position to the transfer position, an arresting means for arresting each of said cassette receiving members at each of the home position and the transfer position with respect to said guiding means, an actuating means for moving a selected one of said cassette receiving members from the home position to the transfer position, and means for selectively cancelling the arrested condition of one of said cassette receiving members with respect to said guide means and coupling the one cassette receiving member to said actuating means.

21. A cassette changer for a tape player, comprising an accommodating member mounted in said tape player for movement between a first position in which said accommodating member is exposed outside said tape player and a second position in which said accommodating member is accommodated in said housing, said accommodating member having a plurality of cassette receiving sections for removably receiving in a row therein a plurality of tape cassettes each of which has a thinner portion and a thicker portion adjacent a tape exposing wall along which a tape is exposed outside the tape cassette, each of said cassette receiving sections being defined by a pair of receiving portions spaced by a greater distance than the thickness of the thinner portion of a tape cassette for supporting the opposite sides of the thinner portion of a tape cassette thereon and a pair of partition walls spaced by a distance substantially equal to the thickness of the thicker portion of a tape cassette for supporting the opposite sides of the thicker portion of a tape cassette thereon.

22. A cassette changer for a tape player, comprising a plurality of cassette receiving members each for removably receiving a tape cassette thereon, an accommodating member for removably receiving said cassette receiving members in a row thereon, said accommodating member being mounted in said tape player for movement between a first position in which said accommodating member is exposed outside to allow tape cassettes to be received into or removed from said cassette receiving members and a second position in which said said accommodating member is accommodated in said tape player, a selectively actuating means for selectively moving one of said cassette receiving members perpendicularly to the row of said cassette receiving members from a home position in said accommodating member in said second position to a transfer position outside said accommodating member, and a carrier mounted for movement in parallel to the row of said cassette receiving members along a side of said accommodating member in the second position remote from the first position for receiving a tape cassette from a selected one of said cassette receiving members moved to the transfer position and setting the tape cassette in position onto a tape driving mechanism of said tape player.

23. A cassette changer for a tape player, comprising an accommodating member for receiving thereon a plurality of tape cassettes in a row such that said tape cassettes extend in planes perpendicular to a front panel of said tape player, said accommodating member being mounted on a body of said tape player for movement between a first position in which said accommodating member is exposed outside said body and a second position in which said accommodating member is accommodated in said body, a pair of tape conveying mechanisms disposed in a substantially symmetrical relationship on the opposite sides of said accommodating member in the second position, and a tape cassette feeding means for selectively feeding one of tape cassettes accommodated on said accommodating member in the second position to alternatively set the tape cassette in position onto said tape conveying mechanisms.

24. A cassette changer for a tape player, comprising a plurality of cassette receiving members each for removably receiving a tape cassette thereon, an accommodating member for receiving said cassette receiving members thereon for individual movement between a first position within said accommodating member and a second position outside said accommodating member, and a plurality of cassette insertion preventing members each mounted on said accommodating member for movement such that the cassette insertion preventing member is normally accommodated in said accommodating member by a corresponding one of said cassette receiving members, but when the corresponding cassette receiving member is in the second position, the cassette insertion preventing member projects into a spacing from which the corresponding cassette receiving member has moved to prevent another tape cassette from being inserted into the spacing.

25. A cassette changer for a tape player, comprising an accommodating member for removably receiving thicker portions of a plurality of tape cassettes in a row therein, said accommodating member being mounted in said tape player for movement between a first position in which tape cassettes can be accommodated into or removed from said accommodating member and a second position in which one of tape cassettes in said accommodating member is selected for playing of a tape thereof, and a passage permitting means provided intermediately of a path of said accommodating member from the first to the second position for permitting only thinner portions of tape cassettes to pass therethrough.

26. A cassette changer for a tape player, comprising an accommodating member for removably receiving thicker portions of a plurality of tape cassettes in a row therein, said accommodating member being mounted in a housing of said tape player for movement through an opening of said housing between a first position in which said accommodating member is exposed to allow tape cassettes to be accommodated into or removed from said accommodating member and a second position within said housing, a door operatively connected to said accommodating member such that said door opens said opening when said accommodating member moves from the second to the first position, but said door closes said opening when said accommodating member moves from the first to the second position, and a passage permitting means provided on said door for permitting only thinner portions of tape cassettes to pass therethrough.

* * * * *